(12) United States Patent
Ishibashi et al.

(10) Patent No.: US 7,803,851 B2
(45) Date of Patent: Sep. 28, 2010

(54) INKJET INK

(75) Inventors: Mitsuru Ishibashi, Yokohama (JP);
 Toru Ushirogouchi, Yokohama (JP);
 Hiroshi Kiyomoto, Hiratsuka (JP);
 Ryozo Akiyama, Mishima (JP);
 Kazuhiko Ohtsu, Mishima (JP); Yukiko Kawakami, Mishima (JP); Masashi Hiroki, Yokohama (JP)

(73) Assignee: Toshiba Tec Kabushiki Kaisha (JP)

( * ) Notice: Subject to any disclaimer, the term of this patent is extended or adjusted under 35 U.S.C. 154(b) by 763 days.

(21) Appl. No.: 11/358,879

(22) Filed: Feb. 21, 2006

(65) Prior Publication Data

US 2006/0189715 A1 Aug. 24, 2006

(30) Foreign Application Priority Data

Feb. 24, 2005 (JP) .............................. 2005-049129

(51) Int. Cl.
 *B60C 1/00* (2006.01)
 *C07D 303/40* (2006.01)
 *C08F 2/50* (2006.01)
 *C08G 18/42* (2006.01)
 *C08G 65/18* (2006.01)
 *C08G 67/02* (2006.01)
 *C08K 3/04* (2006.01)
 *C09D 5/00* (2006.01)
 *C09D 11/00* (2006.01)

(52) U.S. Cl. ........................... 523/160; 522/6; 522/168; 522/170; 523/161; 524/495; 524/496; 524/500; 524/612

(58) Field of Classification Search .................. 523/160, 523/161; 522/6, 168, 170; 524/495, 496, 524/500, 612

See application file for complete search history.

(56) References Cited

U.S. PATENT DOCUMENTS 6,166,100 A 12/2000 Hiwara et al.

2004/0052967 A1 3/2004 Takabayashi
2004/0259976 A1 * 12/2004 Akiyama et al. ............ 523/160

FOREIGN PATENT DOCUMENTS

| EP | 1 514 911 A1 | 3/2005 |
|----|--------------|--------|
| EP | 1 621 594 A1 | 2/2006 |
| JP | 58-32674 | 2/1983 |
| JP | 08-062841 | 3/1996 |
| JP | 09-183928 | 7/1997 |
| JP | 11-035861 | 2/1999 |
| JP | 2000-044857 | 2/2000 |
| JP | 2000-256570 | 9/2000 |
| JP | 2001-31900 | 6/2001 |
| JP | 2001-220526 | 8/2001 |
| JP | 2001-272529 | 10/2001 |
| JP | 2003-096350 | 4/2003 |
| JP | 2004-124077 | 4/2004 |
| JP | 2004-244624 | 9/2004 |
| JP | 2005-255766 | 9/2005 |

OTHER PUBLICATIONS

Communication from European Patent Office re: related application.
Communication (with translation) from Japanese Patent Office re: related application.

* cited by examiner

*Primary Examiner*—Patrick D Niland
(74) *Attorney, Agent, or Firm*—Harness, Dickey & Pierce, P.L.C.

(57) ABSTRACT

An inkjet ink is provided, which includes a pigment dispersion containing an organic dispersant, a black pigment having an average particle diameter of not more than 200 nm, and a resinous dispersing agent, the organic dispersant being formed of at least one polymerizable compound, and the black pigment being included therein at an amount ranging from 2 to 30% by weight based on the organic dispersant, and an ionic compound. A ζ-potential of the black pigment to the at least one polymerizable compound of the organic dispersant is confined within the range of −10 mV to +100 mV.

18 Claims, 5 Drawing Sheets

INKJET INK

CROSS-REFERENCE TO RELATED APPLICATIONS

This application is based upon and claims the benefit of priority from prior Japanese Patent Application No. 2005-049129, filed Feb. 24, 2005, the entire contents of which are incorporated herein by reference.

BACKGROUND OF THE INVENTION

1. Field of the Invention

This invention relates to an inkjet ink.

2. Description of the Related Art

As for the ink to be employed in a printer of an inkjet system, there has been proposed an ink employing pigments in order to improve printing qualities such as water resistance, light resistance, etc. In particular, an ultraviolet-curing ink (UV ink) which can be cured quickly and is minimal in volatilization of organic solvents and excellent in adhesion is now attracting much attention.

As for such a UV ink, one typical example is an ink comprising a radical polymerizable monomer, a photopolymerization initiator and a pigment. Further, there has been proposed a photopolymerizable UV ink comprising a cationic polymerizable monomer, a photo-cation generating agent and a pigment. Since an ink layer containing a UV ink is capable of instantly non-fluidized as it is irradiated with light, it is possible to reliably obtain printed matter of high quality. In an inkjet recording apparatus to be employed for such a quick drying printing, printing heads are linearly arrayed for accelerating printing and the printing is performed by running one pass on a printing face. Therefore, since ink discharging error leads to the generation of linear printing failure (missing) on the printing face, it is necessary to prevent such a discharging error as much as possible. Namely, the ink to be used for such an application as mentioned above is required to be excellent in stability of material in order to achieve very high printing accuracy and delivery stability.

A cation polymerizable ink is capable of overcoming the low sensitivity that may be caused due to the inhibition of curing to be caused by the poor adhesion of radical polymerizable ink and by the effect of oxygen. Since this ink is highly reactive, the physical properties such as viscosity thereof are inherently liable to fluctuate considerably and hence this ink is unstable. The reason for this may be ascribed to the facts that when active species generate once due to various factors (for example, heat, etc.), the active species cannot be easily deactivated, resulting in the generation of numerous dark reactions of ink.

Further, according to recent studies, it has been made clear that in order to enhance the stability of these inks, it is necessary to stabilize the conditions of inks not only macroscopically but also microscopically. For example, as the particle diameter of pigment becomes smaller and the dispersion stability of pigment becomes higher, the printing error of ink can be minimized more effectively. Not only the cation polymerizable ink mentioned above but also the ink containing therein an ionic substance (a polymerization initiator, a surfactant, etc.) is generally liable to flocculate with time due to salting-out and the like in a colloidal dispersion system thereof as compared with the conventional radical polymerizable ink. As a result, these inks are inferior in storage stability. When the viscosity, surface tension and elastic force of ink fluctuate due to the reaction of ink, it will lead to the disturbance of the ejecting shape of ink, to poor reproducibility of printing, and in the worst case, to a critical condition such as defective discharging of ink and clogging of ink. Therefore, this problem is very serious.

As for the criterion to determine the dispersion stability of pigment particles, although ζ(zeta)-potential has been conventionally employed some occasions, the employment of ζ-potential has been limited to the case where a dispersion medium is aqueous. In the case of UV ink where the aforementioned polymerizable monomer is employed however, there is no means other than adapting a method of confirming the dispersion stability through the investigation of actual changes with time of particle diameter of pigment and viscosity of ink.

BRIEF SUMMARY OF THE INVENTION

Therefore, an object of the present invention is to provide an inkjet ink wherein pigment particles can be dispersed excellently, thus enabling the ink to be suitably used as a UV-curing type inkjet ink for on-demand printing.

According to one aspect of the present invention, there is provided an inkjet ink comprising:

a pigment dispersion containing an organic dispersant, a black pigment having an average particle diameter of not more than 200 nm, and a resinous dispersing agent, the organic dispersant being formed of at least one polymerizable compound, and the black pigment being included therein at an amount ranging from 2 to 30% by weight based on the organic dispersant; and an ionic compound;

wherein a ζ-potential of the black pigment to the at least one polymerizable compound of the organic dispersant is confined within the range of −10 mV to +100 mV.

According to another aspect of the present invention, there is provided an inkjet ink comprising:

a pigment dispersion containing an organic dispersant, a cyan pigment having an average particle diameter of not more than 200 nm, and a resinous dispersing agent, the organic dispersant being formed of at least one polymerizable compound, and the cyan pigment being included therein at an amount ranging from 2 to 30% by weight based on the organic dispersant; and an ionic compound;

wherein a ζ-potential of the cyan pigment to the at least one polymerizable compound of the organic dispersant is confined within the range of +30 mV to +100 mV.

According to a further aspect of the present invention, there is provided an inkjet ink comprising:

a pigment dispersion containing an organic dispersant, a yellow pigment having an average particle diameter of not more than 200 nm, and a resinous dispersing agent, the organic dispersant being formed of at least one polymerizable compound, and the yellow pigment being included therein at an amount ranging from 2 to 30% by weight based on the organic dispersant; and an ionic compound;

wherein a ζ-potential of the yellow pigment to the at least one polymerizable compound of the organic dispersant is confined within the range of −15 mV to +100 mV.

According to a further aspect of the present invention, there is provided an inkjet ink comprising:

a pigment dispersion containing an organic dispersant, a white pigment having an average particle diameter of not more than 300 nm, and a resinous dispersing agent, the organic dispersant being formed of at least one polymerizable compound, and the white pigment being included therein at an amount ranging from 2 to 50% by weight based on the organic dispersant; and an ionic compound;

wherein a ζ-potential of the white pigment to the at least one polymerizable compound of the organic dispersant is confined within the range of +40 mV to +100 mV.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

Figure 1:
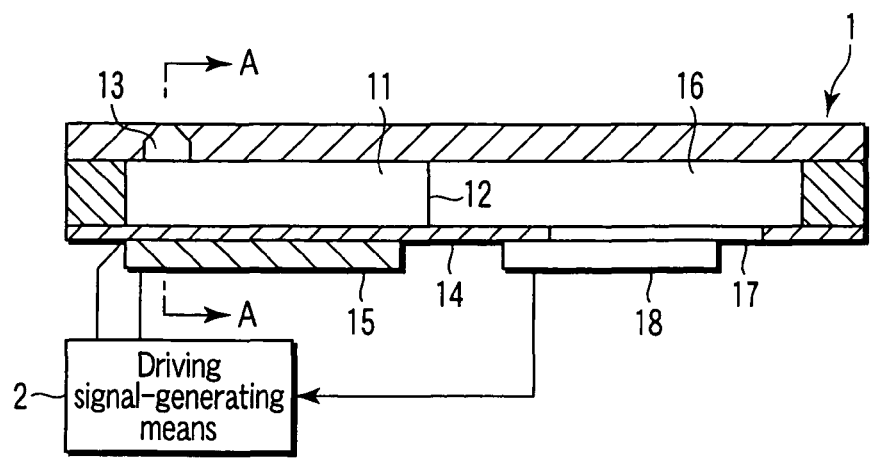
FIG. 1 illustrates schematically the main components of an inkjet recording apparatus to be employed in a printing method according to one embodiment of the present invention.

Next, embodiments of the present invention will be explained as follows.

The inkjet ink according to one embodiment of the present invention is an ink which can be prepared by diluting a pigment dispersion comprising a pigment dispersed in an organic dispersant with a diluting solvent. More specifically, this inkjet ink is one which is designed to be discharged from the printing head of a recording apparatus according to an inkjet system.

As for the coloring pigments useful in this case, there is no particular limitation as long as they have optical coloring and tinting properties demanded of pigments and the average particle diameter thereof is confined to not more than 200 nm. If the average particle diameter of the pigments exceeds 200 nm, discharge failure may be more likely to be generated on the occasion of discharging ink from the inkjet head. Therefore, the average particle diameter of pigment in the ink should be confined to not more than 200 nm. More preferably, the average particle diameter of pigment should be confined to not more than 180 nm. The average particle diameter of pigment can be determined according to the following method. First of all, a sample of ink is diluted to about 500 times in volume by using a solvent. Then, this diluted sample is subjected to the measurement of particle diameter by dynamic light scattering method, thereby calculating a cumulant average particle diameter by using cumulant analysis. The value thus obtained is assumed as being an average particle diameter of pigment.

As for the examples of pigments useful in this case, they include photoabsorptive pigments for example. Specific examples of such photoabsorptive pigments include carbonaceous pigment such as carbon black, carbon refined and carbon nanotube; metal oxide pigments such as iron black, cobalt blue, zinc oxide, titanium oxide, chromium oxide and iron oxide; sulfide pigments such as zinc sulfide; phthalocyanine pigments; pigments formed of salts such as metal sulfate, metal carbonate, metal silicate and metal phosphate; and pigments formed of metal powder such as aluminum powder, bronze powder and zinc powder.

Further, it is also possible to employ organic pigments including, for example, dye chelate; nitro pigments; nitroso pigments such as aniline black and naphthol green B; azo pigments such as Bordeaux 10B, Lake red 4R and chromophthal red (including azo lake, insoluble azo pigment, condensed azo pigment, chelate azo pigment); Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinophthalene pigment, etc.); threne pigments such as thioindigo red and indanthrone blue; quinacridine pigment; and isoindolinone pigment.

As for the pigments that can be employed in a black ink, it is possible to employ carbon black such as Raven 5750, Raven 5250, Raven 5000, Raven 3500, Raven 1255 and Raven 700 (all available from Colombia Co., Ltd.); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (all available from Cabot Co., Ltd.); No. 2300, No. 900, MCF88, No. 33, No. 40, No. 45, No. 52, MA7, MA8, MA100 and No. 2200B (all available from Mitsubishi Chemical Co., Ltd.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 (all available from Dexa Co., Ltd.).

Further, as for the pigments that can be employed in a cyan ink, examples thereof include C.I. Pigment Blue 15:3, C.I. Pigment Blue 15:34, C.I. Pigment Blue 16, C.I. Pigment Blue 22, C.I. Pigment Blue 60, C.I. Pigment Blue 1, C.I. Pigment Blue 2, C.I. Pigment Blue 3, C.I. Vat Blue 4, and C.I. Vat Blue 60.

As for the yellow pigments that can be employed in a yellow ink, examples thereof include C.I. Pigment Yellow 128, C.I. Pigment Yellow 129, C.I. Pigment Yellow 151, C.I. Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 139, C.I. Pigment Yellow 150 and Pigment Yellow 180. In particular, it is more preferable, among these yellow pigments, to employ Pigment Yellow 180, since it can be hardly discolored due to the resistance thereof to oxygen.

Further, it is also useful, as a color component, to employ white pigments such as natural clay, white lead, zinc white and metal carbonates such as magnesium carbonate, metal oxides such as barium and titanium. The liquid ink containing white pigments can be employed not only in white printing but also in the amendments of printing or underlying images through overwriting. However, if an average particle diameter is too small in the case of white pigment, it would be impossible to obtain color development. On the other hand, if an average particle diameter exceeds 300 nm, discharge failure may be more likely to be generated on the occasion of discharging ink from the inkjet head. Therefore, the average particle diameter of white pigment should be confined to not more than 300 nm.

The pigments to be employed in this case may be further provided with other properties such as magnetism, fluorescence, conductivity, dielectric property, etc. in addition to the coloring and tinting properties. If the pigments are provided with these various properties, it may become possible to obtain an image having various functions. Further, the pigments may contain particles which are effective in providing an ink layer with increased heat resistance or physical strength.

As for fluorescent pigments, it is possible to employ not only inorganic fluorescence materials but also organic fluorescence materials. As for the inorganic fluorescence materials, specific examples of which include $MgWO_4$, $CaWO_4$, $(Ca,Zn)(PO_4)_2$:$Ti^+$, $Ba_2P_2O_7$:Ti, $BaSi_2O_5$:$Pb^{2+}$, $Sr_2P_2O_7$:$Sn^{2+}$, $SrFB_2O_{3.5}$:$Eu^{2+}$, $MgAl_{16}O_{27}$:$Eu^{2+}$, and inorganic acid salts such as tungstenate and sulfate. As for the organic fluorescence materials, specific examples of which include acridine orange, amino acridine, quinacrine, anilinonaphthalene sulfonate derivatives, anthroyl oxystearic acid, auramine O, chlorotetracycline, cyanine dye such as merocyaninen and 1,1'-dihexyl-2,2'-oxacarboxycyanine, dansyl sulfonamide, dansyl choline, dansyl galactoside, dansyl tolidine, dansyl chloride derivatives such as dansyl chloride, diphenyl hexatriene, eosin, ∈-adenosine, ethidium bromide, fluorescein, foamycine, 4-benzoylamide-4'-aminostilbene-2,2'-sulfonic acid, β-naphthyl triphosphic acid, oxonol dye, parinaric acid derivatives, perylene, N-phenylnaphthyl amine, pyrene, safranine O, fluorescamine, fluorescein isocyanate, 7-chloronitrobenzo-2-oxa-1,3-diazole, dansylaziridine, 5-(iodoacetamide ethyl) aminonaphthalene-1-sulfonic acid, 5-iodofluorescein, N-(1-anilinonaphthyl 4) maleimide, N-(7-dimethyl-4-methylcumanyl) maleimide, N-(3-pyrene) maleimide, eosin-5-iodoacetamide, fluorescein mercury acetate, 2-[4'-(2"-iodoacetamide)]aminonaphthalene-6-sulfonic acid, eosin, Rhodamine derivatives, organic electroluminescent dye, organic electroluminescent polymer, organic electroluminescent crystal and dendrimer.

In the pigment dispersion according to one embodiment of the present invention, it is also possible to incorporate dyes as an auxiliary component of pigment therein for the purpose of adjusting color. For example, dyes which are low in acidity and basicity and excellent in solubility to a solvent, such as azoic dye, sulfur (building materials) dye, disperse dye, fluorescent brightening agent and oil soluble dye can be employed. Among them, it is more preferable to employ oil soluble dye such as azo dye, triaryl methane dye, anthraquinone dye and azine dye. Specific examples of such oil soluble dye include C.I. Slovent Yellow-2, 6, 14, 15, 16, 19, 21, 33, 56, 61 and 80; Diaresin Yellow-A, F, GRN and GG; C.I. Slovent Violet-8, 13, 14, 21 and 27; C.I. Disperse Violet-1; Sumiplast Violet RR; C.I. Slovent Blue-2, 11, 12, 25 and 35; Diresin Blue-J, A, K and N; Orient Oil Blue-IIN, #603; and Sumiplast Blue BG.

These pigments and dyes described above may be employed singly or in combination of two or more kinds for the purpose of enhancing the photoabsorbance, saturation and color vision.

The color pigments should be incorporated in an organic dispersant at an amount ranging from 2 to 30% by weight. If the content of the color pigments is less than 2% by weight, it would become difficult to secure a sufficient color density when the resultant material is employed as a coloring material in a subsequent process. On the other hand, if the content of the color pigment exceeds 30% by weight, the stability of the resultant material would be degraded. Therefore, the mixing ratio of the color pigment to an organic dispersant should more preferably be confined within the range of 3 to 27% by weight. In the case of the white pigment, it should be incorporated in an organic dispersant at an amount ranging from 2 to 50% by weight. If the content of the white pigments is less than 2% by weight, it would become difficult to secure a sufficient color density when the resultant material is employed as a coloring material in a subsequent process. On the other hand, if the content of the white pigment exceeds 50% by weight, the stability of the resultant material would be degraded, thus raising a problem. Therefore, the mixing ratio of the white pigment to an organic dispersant should more preferably be confined within the range of 5 to 30% by weight.

The average particle diameter of the aforementioned pigment particles in the inkjet ink should be as small as possible, provided that they can be appropriately discharged from the inkjet head and the function thereof is not substantially hindered. Generally, the average particle diameter of the pigment particles is confined to not larger than $\frac{1}{3}$, more preferably not larger than about $\frac{1}{10}$ of the diameter of the pore size of nozzle through which the inkjet ink is to be discharged. Incidentally, the diameter of the pore size of nozzle is typically not larger than 10 μm, more preferably not larger than 5 μm. Therefore, a preferable particle diameter of the pigments to be employed in the inkjet ink for printing should be not larger than 0.3 μm. Therefore, the average particle diameter of the pigments is usually confined within the range of 0.05 to 0.2 μm.

In one embodiment of the present invention, a resinous dispersing agent is employed for enabling the pigment particles to be uniformly dispersed in an organic dispersant. This resinous dispersing agent is capable of entering into the interface between the pigment particles and the organic dispersant, thereby preventing the pigment particles from being flocculated. This resinous dispersing agent also acts to enhance the affinity of pigment particles to the dispersant, thus preventing the pigment particles from settling. Basically, any kind of resin which is excellent in affinity to the dispersant and provided with a steric separating power for preventing the flocculation among the pigments can be employed as a resinous dispersing agent. For example, it is possible to employ a resin composition containing, as a major component, at least one selected from the group consisting of vinyl polymer or copolymer, acrylic polymer or copolymer, polyester, polyamide, polyimide, polyurethane, amino polymer, silicon-containing polymer, sulfur-containing polymer, fluorine-containing polymer and epoxy resin. These resinous dispersing agents would be referred to as a first resinous dispersing agent in the following description.

In order to provide a dispersing agent with an enhanced dispersibility of pigment particles, the terminal of the aforementioned polymers should preferably be excellent in bonding property and in affinity to the pigment particles. On the other hand, the main chain of the polymers should preferably be excellent in affinity to the dispersant and provided with a physical repulsive force or electrostatic repulsive force for preventing the reflocculation with other pigment particles. For example, the aforementioned polymers should preferably have a solubility parameter (about ±5 $MPa^{1/2}$) which is equivalent to that of the dispersant, a molecular weight ranging from several hundreds to several tens of thousands, a polymerization degree ranging from about 10 to 200 and a Tg ranging from 10° C. to 200° C. Further, the aforementioned polymers should preferably have a terminal which is relatively high in chemical bond (covalent bond, electrostatic force, etc.), thereby providing it with affinity to the pigment. When the aforementioned polymers are respectively composed of a copolymer comprising two or more kinds of monomers, it is generally possible to provide the aforementioned polymers with the aforementioned composite functions. As for such polymers, a block copolymer can be preferably employed.

Although the aforementioned terminal of polymer may not necessarily be limited to only one, it can be generally introduced into an end portion of a graft copolymer or an end portion of tandem polymer. The polymer thus obtained is not only strong in bonding but also readily capable of forming a steric hindrance which is effective in suppressing the reflocculation among pigment particles.

As for the monomer for synthesizing such a polymer, it is possible to employ styrene and substituted styrene, (meta) acrylate, (meta)acrylic acid, (meta)acrylic amide, maleic acid, maleic anhydride, maleate, itaconic acid and esters thereof, hydroxystyrene and hydrogen-substituted derivatives thereof, etc. Further, monomers comprising an ester side chain having long chain alkyl, polyether, polycarbonate, polyester chain, etc., are advantageous in creating the aforementioned tandem polymer.

As for the aforementioned polymer, it is possible to employ the following compounds. They include, for example, polyester compounds to be obtained through a dehydrating condensation between a dihydroxy compound such as poly(oxyphthaloyloxym ethylene-1,4-phenylenemethylene) and poly(1,4-cyclohexylene dimethylene succinate) and dicarboxylic acid; polyamide to be obtained through a condensation among adipic acid, diamine such as hexamethylene diamine, and dicarboxylic acid; polyamide to be obtained through the ring opening of cyclic lactone such as ∈-caprolactam; a kind of polyamide which is relatively low in Tg and which can be obtained through a condensation between tetracarboxylic acid such as pyromellitic acid and aliphatic diamine; polyurethane resin to be obtained from a reaction between aliphatic diisocyanate such as isophorone dicyanate and dihydroxy compound; polyvinyl pyridine compound; polydimethyl siloxane and a ladder type polymer thereof; polyvinyl alcohol and vinyl ether compound; and polyether polymer to be obtained through the polymerization of an oxirane compound having a relatively rigid skeleton. The terminal of these polymers may be capped with a compound having a functional group excellent in affinity to the pigment. As for specific examples of such a functional group, they include amino group, phosphoric group, etc.

Further, a polymer compound to be obtained through the polymerization between an amphipathic polymerizable surfactant having a polymerizable group and a crosslinking monomer and/or monofunctional monomer can be also preferably employed as the first resinous dispersing agent. As for the polymerizable group of the polymerizable surfactant, it is possible to preferably employ an unsaturated hydrocarbon group such as vinyl group, allyl group, acryloyl group, methacryloyl group, propenyl group, vinylidene group and vinylene group. These groups can be employed singly or in combination of two or more kinds. As for the hydrophilic group of the polymerizable surfactant, it can be selected according to the dispersant. When the dispersant is aqueous, at least one selected from sulfone group, sulfonic acid group, carboxyl group, carbonyl group, hydroxyl group and salts thereof can be preferably employed. On the other hand, when the dispersant is oily, it is possible to employ carboxyl group and esters thereof, lactone compound, carbonyl group and hydroxyl group.

In order to enhance the dispersion stability of the pigment particles, it is also effective to perform the surface modification of the pigment particles. This surface modification is effective in enhancing the bonding between the first resinous dispersing agent and the pigment particles. For example, when carboxyl group or sulfonic acid group, which can be strongly bonded to amino group representing a typical example of the terminal of the dispersant, is attached to part of the surface of the pigment particles, it is possible to remarkably enhance the dispersion stability of pigment. The modification of the surface of pigment by using these functional groups can be executed by a method wherein the surface of the pigment particles is oxidized by employing a suitable oxidizing agent. Alternatively, it is also possible to utilizing the effects of sulfonating agent. As for the sulfonating agent useful in this case, it is possible to employ sulfuric acid, fuming sulfuric acid, $SO_2$, $SO_3$, derivatives thereof such as halogenated sulfonic acid, and a combination of a catalyst with rare earth element. It is also possible to employ, as a sulfonating agent, a compound which is highly reactive such as an organometallic compound having sulfonic acid group or a vinyl compound.

Furthermore, it is also possible to suitably apply Strecker's Reaction to the surface modification of the pigment particles.

In this reaction, the surface modification can be executed by applying a salt such as sodium sulfide to the pigment particles that have been subjected to halogenation treatment. Generally, even if a sulfone modifying pigment (synergist) which is high in physical adsorption to pigment is adsorbed onto the surface of the pigment particles, almost the same effects may be obtained. A surface-modified pigment which surface has been directly modified with a sulfonating agent is generally more excellent in bonding strength between the pigment and sulfonic acid group as compared with a synergist and hence excellent in dispersion stability. Therefore, it is more preferable to employ a sulfonating agent. However, as long as the dispersion stability can be sufficiently secured even if a synergist is employed in viewpoints of easiness of handling and cost, there is no reason for denying it.

In order to perform further stronger surface modification, it is preferable to perform a microencapsulating treatment in addition to the formation of aforementioned covalent bonding between a resinous dispersing agent and the pigment particles. The microencapsulated pigment can be manufactured according to any known method. For example, it is possible to employ a phase separation method (coacervation), a submerged drying method (interfacial precipitation method), spray drying method, pancoating method, cure coating in liquid, interfacial polymerizing method, an in-situ method, and an ultrasonication method. More specifically, it is possible to employ a method of manufacturing an anionic microcapsulated pigment as disclosed in JP Patent Laid-open Publication (Kokai) No. 9-151342 (1997) or a method described in JP Patent Laid-open Publication (Kokai) No. 10-316909 (1998).

The ratio of modification by a functional group can be directly measured by a surface spectroscopic analysis such as EDX if a modifying element includes sulfur atom or phosphorus atom for instance. In this case, the content of element to be measured should preferably be about 0.1% or more of the surface composition of pigment particles. If the modification ratio is too high, the acidity of pigment would become too strong so that the pigment may be reacted with a dispersant, thereby possibly accelerating the flocculation of pigment particles as well as the increase in viscosity of the resultant dispersion. In order to avoid such a problem, the modification ratio should desirably be confined to about 30% at most. The ratio of modification such as the covering ratio by using carboxylic acid or resin, which cannot be easily measured by EDX can be estimated on the basis of the surface area that can be determined by adsorption process and the number of modifying group that can be estimated from a titrimetric method. Alternatively, the modification ratio can be estimated by thermogravimetric analysis which will be conducted to such an extent that would not cause the decomposition of the pigment particles.

The appropriate mixing ratio of the first resinous dispersing agent varies depending on the kinds of pigments. For example, in the cases of black pigment and cyan pigment, the mixing ratio the first resinous dispersing agent would be confined within the range of 10 to 30% based on the weight of pigment. In the cases of yellow pigment, the mixing ratio the first resinous dispersing agent would be confined within the range of 10 to 60% based on the weight of pigment. Further, in the cases of white pigment, the mixing ratio the first resinous dispersing agent would be confined within the range of 5 to 30% based on the weight of pigment. In any of these cases, if the mixing ratio of the first resinous dispersing agent is too small, it would become difficult to obtain sufficient effects. On the other hand, if the mixing ratio of the first resinous dispersing agent is too large, it would raise various problems that the viscosity of the dispersion for inkjet would be increased extremely and the stability of the dispersion would be degraded, thus accelerating the flocculation thereof.

By using an appropriate mixing ratio of the first resinous dispersing agent, pigment particles covered with resin can be manufactured. Further, by dispersing these resin-covered pigment particles in an organic dispersant at a predetermined ratio, a pigment dispersion for manufacturing an inkjet ink according to one embodiment of the present invention can be obtained.

The organic dispersant to be employed in one embodiment of the present invention is substantially formed of a polymerizable compound which is characterized in that it can be polymerized in the presence of acid or radical. This expression of "dispersant is substantially formed of a polymerizable compound" is intended to include not only a situation wherein "dispersant is formed of only a polymerizable compound" but also a situation wherein "dispersant is formed of a polymerizable compound and a minute amount of impurities which are unavoidably intermingled in the dispersant". This "a minute amount of impurities which are unavoidably intermingled in the dispersant" may be existed in the entire dispersant at a concentration of, at most, not more than 10% by weight based a total weight of the dispersant. More preferably, the content of "impurities which are unavoidably intermingled in the dispersant" should be confined to not more than 5% by weight in general. If the content of impurities exceeds over this upper limit, when residual impurities in the solvent may fly into air atmosphere, raising the problem of environmental safety or residual impurities may remain inside a cured material, thus deteriorating the curing property of the ink. As for the dispersant in one embodiment of the present invention, it is most preferable to employ a compound which can be polymerized in the presence of an acid to be employed in a photo-cation curing inkjet ink, since a photo-acid generating agent and an ionic compound can be concurrently employed. It is also effective to employ a polymerizable compound to be employed in other kinds of photo-curing type inkjet ink. Incidentally, the acid polymerizable compound is also referred to as a photo-cation polymerizable compound.

The organic dispersant is employed as a dispersing medium for dispersing pigment in a pigment dispersion. By using a similar organic dispersant as a solvent, the pigment dispersion is diluted to obtain the inkjet ink according one embodiment of the present invention. In the followings, the dispersing medium for the pigment dispersion will be discussed as a main subject matter. However, the explanations on the solvent for inkjet ink will be also set forth.

The polymerizable compound which takes place the crosslinking in the presence of an acid should preferably exhibit singly a fluidity of about 100 cp (=mPa·s) or less in viscosity at a temperature of 50° C. As for specific examples of such a compound, it includes compounds 1000 or less in molecular weight and having a cyclic ether group such as epoxy group, oxetane group and oxorane group for instance. It is also possible to additionally use acrylic or vinyl compounds having the aforementioned substituent groups on their side chain; carbonate compounds; low molecular melamine compounds; and a monomer having a vinyl linkage which is capable of effecting cation polymerization such as vinyl ethers, vinyl carbazoles, styrene derivatives, alpha-methylstyrene derivatives, and vinyl alcohol esters including esters of vinyl alcohol with acrylic or methacrylic acid.

The pigment dispersion according to one embodiment of the present invention should preferably have a viscosity of not higher than 100 mPa·s (generally, the viscosity of the dispersant is about 30 mPa·s at most) at a temperature of 25° C. in order to enable the pigment dispersion to be applied to inkjet printing in particular. The aforementioned pigments are dispersed in a predetermined dispersant so as to confine the viscosity thereof to the aforementioned range. According to one embodiment of the present invention, the dispersant should preferably be selected from compounds having a viscosity of not higher than 30 mPa·s at 25° C. and a boiling point of not lower than 150° C. under 1 atm. When photocuring property is taken into account, a dispersant containing, as a major component, a cation polymerizable compound is preferable. Since the upper limit of viscosity of dispersant is regulated as described above, it is possible to enhance the dispersibility of pigment particles and to provide the ink with sufficient fluidity. Further, since lower limit of boiling point of dispersant is regulated as described above, it is now possible to restrict, as low as possible, the inclusion of harmful volatile components in the pigment dispersion. When the viscosity of the dispersant exceeds 30 mPa·s, it would become difficult to correctly execute the discharging of ink especially when the dispersant is employed in the manufacture of inkjet ink.

When the polymerizable compound which can be polymerized in the presence of an acid contains an aliphatic skeleton or an alicyclic skeleton, it is possible, when the polymerizable compound is employed together with other kinds of components, to enhance the transparency of inkjet ink as it is exposed to light. As a result, it is possible to provide an ink layer with appropriate thermoplasticity and resolubility after the curing of the ink layer. Therefore, various properties such as sensitivity, fixing property, transferability and maintenancing property can be enhanced. Especially, when the polymerizable compound is formed of an epoxy compound having an alicyclic skeleton, it is possible to provide the ink with not only higher boiling point but also lower viscosity to some degree in addition to the reactivity.

As long as the quantity is limited, a compound which is relatively high in viscosity such as those which are solid at normal temperature for example may be incorporated into the dispersant, thus constituting part of the dispersant. When such a component is included in the dispersant, the dispersibility of pigment particles can be further enhanced and, at the same time, the flexibility of ink layer after the curing thereof can be enhanced. Further, when a compound which is relatively large in valence and high in reactivity is employed in this case, the hardness and solvent resistance of cured matter can be enhanced. Specific examples of such a compound include compounds 5000 or less in molecular weight and having a cyclic ether group such as epoxy group, oxetane group and oxorane group for instance; acrylic or vinyl compounds having the aforementioned substituent groups on their side chain; carbonate compounds; low molecular melamine compounds; a monomer having a vinyl linkage which is capable of effecting cation polymerization such as vinyl ethers, vinyl carbazoles, styrene derivatives, alpha-methylstyrene derivatives, and vinyl alcohol esters including esters of vinyl alcohol with acrylic or methacrylic acid; and a oligomer to be obtained from the polymerization of at least one kind of the aforementioned monomers.

Further, the dispersant may contain the following compounds in addition to the aforementioned components. Namely, they include a homopolymer or copolymer of vinyl alcohol; resins containing acid-reactive and dehydrocondensing OH group, COOH group, acetal group, etc. and having a molecular weight of 5000 or less such as casein and cellulose; polycarbonate resins having a molecular weight of 5000 or less; copolymers to be derived from a reaction between polyamic acid, polyamino acid or acrylic acid and a vinyl compound having an acid-polymerizable double bond on its side chain; copolymers to be derived from a reaction between vinyl alcohol and a vinyl compound having an acid-polymerizable double bond on its side chain; and methylolated melamine resin.

When preparing an inkjet ink having the following composition in particular, at least 50 parts by weight of the solvent should be formed of an acid-polymerizable compound provided with an alicyclic skeleton and/or an aliphatic skeleton and having a viscosity of not higher than 50 mPa·s and a boiling point of not lower than 150° C. In this case, a photoacid generating agent is included in the ink at an amount of 1 to 10 parts by weight based on 100 parts by weight of the acid-polymerizable compound, and a pigment is employed as a coloring component.

By using an acid-polymerizable compound provided with an alicyclic skeleton and/or an aliphatic skeleton, it is possible to enhance the transparency of inkjet ink as it is exposed to light. As a result, it is possible to provide an ink layer with appropriate thermoplasticity and resolubility after the curing of the ink layer. Therefore, various properties such as sensitivity, fixing property, transferability and maintenancing property can be enhanced. Especially, when the acid-polymerizable compound is formed of an epoxy compound having an alicyclic skeleton, it is possible to provide the ink with not only higher boiling point but also lower viscosity to some degree in addition to the reactivity.

Since the viscosity of the acid-polymerizable compound is confined to not more than 50 mPa·s under normal temperature and atmospheric pressure, it is possible to provide an inkjet ink with sufficient fluidity. Further, since the boiling point of the acid-polymerizable compound is confined to not less than 150° C., the content of volatile components in the inkjet ink can be reduced to as minimal as possible.

As for the acid-polymerizable compound having epoxy group, it is possible to employ a compound having a hydrocarbon group having a bivalent aliphatic or alicyclic skeleton each having 1 to 15 carbon atoms wherein epoxy or alicyclic epoxy group is attached to at least one of the terminals of the hydrocarbon group. It is also possible to employ a compound having a bivalent group comprising an aliphatic chain or an alicyclic skeleton wherein epoxy or alicyclic epoxy group is attached to at least one of the terminals of the bivalent group.

When an epoxy compound satisfying the aforementioned conditions is employed as a solvent and included in a solvent for inkjet ink at an amount of at least 50 parts by weight, it is possible to secure sufficient effects thereof. Incidentally, if the solvent is to be constituted solely by the epoxy compound, the content of the epoxy compound should preferably be 30% by weight or more based on the entire weight of inkjet ink, and more preferably be 40% by weight or more based on the entire weight of inkjet ink. If the content of the epoxy compound is less than 30% by weight, the clogging of nozzle may generate or the thermoplasticity of the ink may be degraded.

Although there is not any particular limitation with regard to the number of epoxy group to be introduced into the molecular skeleton of the epoxy compound, it is preferable that the number of valence is limited to around 2 to 3 at most in order to provide an ink layer with flexibility and resolubility after the curing thereof. Generally, these acid-polymerizable compounds are generally formed of a mixture consisting of a compound having a viscosity of as low as 1 mPa·s to 30 mPa·s and a compound having a viscosity which is equivalent to or higher than the aforementioned range. However, if these compounds of low viscosity are excessively included in the ink, the discharging of inkjet ink may be disturbed or the volatility of ink may be increased. Therefore, the content of these low viscosity compounds should preferably be limited to 90 parts by weight at most.

When the epoxy compound represented by the following general formula (3) is employed in combination with an alicyclic epoxy compound, the adhesion and curing properties of printed matter can be enhanced in particular.

$$R_{11}\text{-}R_{12}\text{-}(R_{11})_j \qquad (3)$$

In this general formula (3), $R_{11}$ is glycidyl ether group; $R_{12}$ is alkylene or hydroxyl-substituted alkylene group having 1 to 6 carbon atoms, or alkylene group having an alicyclic or hydroxyl-substituted alicyclic skeleton and 6 to 15 carbon atoms; and j is an integer ranging from 1 to 3. Among the compounds to be represented by the aforementioned general formula (3), diglycidyl ether of neopentyl glycol is high in reactivity to an acid and hence most preferable.

As for specific examples of the aforementioned alicyclic epoxy compounds, they include alicyclic epoxy compounds such as Celloxide 2021, Celloxide 2021A, Celloxide 2021P, Celloxide 2081, Celloxide 2000 and Celloxide 3000 (all available from Daicel Chemical Industries Ltd.); (metha)acrylate compounds having epoxy group, such as Cyclomer A200 and Cyclomer M100; methacrylate having methylglycidyl group such as MGMA; glycidol representing a low molecular epoxy compound; β-methylepichlorohydrin; α-pinene oxide; α-olefin monoepoxide having 12 to 14 carbon atoms; α-olefin monoepoxide having 16 to 18 carbon atoms; epoxidized soy bean oil such as Dimac S-300K; epoxidized linseed oil such as Dimac L-500; and polyfunctional epoxy compounds such as Epolead GT301 and Epolead GT401.

It is also possible to employ alicyclic epoxy compounds (such as Cylacure; Dow Chemical Co., Ltd, U.S.); low molecular weight phenol compounds which are hydrogenated and aliphatized with terminal hydroxyl group thereof being substituted by a group having epoxy; glycidyl ether of polyhydric aliphatic alcohol/alicyclic alcohol such as ethylene glycol, glycerin, neopentyl alcohol, hexanediol and trimethylol propane; glycidyl ester of hexahydrophthalic acid; and glycidyl esters of hydrogenated aromatic polyhydric carboxylic acid.

Further, in order to improve the chemical resistance of the printed image, the ink may include a transparent liquid epoxy resin excellent in weathering resistance and high in Tg. Specific examples of such a resin include epoxidized polybutadiene such as Epolead PB3600 and PB3600M (trademark, Daicel Chemical Industries., Ltd.); EHPE3150; and EHPE3150CE (trademark, Daicel Chemical Industries., Ltd.). In addition to these epoxy resins, it is also possible to incorporate lactone-modified alicyclic epoxy resin, examples of which including Placell GL61, GL62, G101, G102, G105, G401, G402, G403X (trademark, Daicel Chemical Industries., Ltd.), etc.

Among these compounds, Celloxide 2000, Celloxide 3000, and glycidyl ether to be derived from the modification of α-pinene oxide ethylene glycol, glycerine, neopentyl alcohol or hexanediol are more preferable in viewpoints of viscosity and volatility. In particular, limonene dioxide (Celoxide 3000; product name) to be obtained from a natural material as a starting material is also preferable from the viewpoints of viscosity and reactivity.

The inkjet ink that can be prepared using the following composition wherein a combination of an alicyclic epoxy compound and an aliphatic epoxy compound is employed as a solvent would become excellent in hardness, adhesion and transferability of ink layer after the curing thereof in addition to satisfactory photosensitivity. More specifically, this inkjet ink is formed of 30 to 70 parts by weight of an alicyclic epoxy compound having terpenoid skeleton or norbornane skeleton as an acid-polymerizable compound; 30 to 70 parts by weight of an epoxy compound where at least two glycidyl ether groups have an aliphatic skeleton having not more than six carbon atoms also as an acid-polymerizable compound; 1 to 6 parts by weight of hexafluorophosphate compound having a phenylsulfonium skeleton as a photo-acid generating agent; and 1 to 10 parts by weight of pigment as a coloring component.

As for the alicyclic epoxy compound, it is possible to employ limonene(di)oxide, (di)oxabicycloheptane and substituted compounds thereof. As for the epoxy compound having an aliphatic skeleton having not more than six carbon atoms, it is possible to employ neopentylglycol diglycidyl ether, ethyleneglycol diglycidyl ether, glycerol di(tri)glycidyl ether, and 1,6-hexanediol diglycidyl ether. Among them, a combination of limonene(di)oxide and neopentylglycol diglycidyl ether is most preferable. Incidentally, if the number of carbon atoms exceeds 6 in the aliphatic skeleton, the hardness, adhesion and transferability of ink layer after the curing thereof may be degraded. However, even if the number of carbon atoms exceeds 6 in the aliphatic skeleton, it may be possible to sustain the hardness of ink layer after the curing thereof provided that an alicyclic skeleton is included in the structure thereof. In this case, if the number of carbon atom is confined to 15 at most, it may be possible to secure the similar properties as described above. Specific examples of such a compound are hydrogenated bisphenol A, glycidyl etherified bisphenol compound. However, since these compounds are generally high in viscosity, it is preferable to employ an epoxy compound having not more than six carbon atoms.

As for the acid-polymerizable compound (photo-cation polymerizable compound), it is preferable to employ at least one selected from the group consisting of limonene dioxide, neopentylglycol diglycidyl ether, [1-ethyl(3-oxetanyl)]methyl ether, and a cyclic ether compound having a substituent group including a vinyl ether structure. When these compounds are employed, it is possible to enhance the curability of ink.

When the acid-polymerizable compound is formed of a combination of the aforementioned epoxy compounds, the ink layer after the curing thereof is enabled to refluidize at a temperature of as low as 50° C., preferably at a temperature of about 80° C., the fixing and transcription of ink can be performed without any problem. In this case, the ink layer after the curing thereof can be resolubilized in the inkjet ink or by using an organic solvent made of a low boiling point petroleum component such as lower alcohol such as ethanol which is relatively safe in handling and isoper. Therefore, it is now possible to inhibit the generation of clogging of nozzle. Even if nozzle is caused to clog, it can be easily overcome, thus remarkably facilitating the maintenance of apparatus.

The properties demanded of printed matter may vary depending on the application thereof. For example, when the printed matter is to be employed for the outer package of a can or PET bottle or for the outer package of a container made of an oily material, the printed matter is required to be excellent in solvent resistance. Further, in order to cope with high-speed printing, the ink is required to be cured at a high speed.

In order to cope with the aforementioned situations, a compound having phenolic hydroxyl group such as glycidyl ether compound of bisphenol A; glycidyl ether compound of phenolic aligomer such as phenol novolac and polyhydroxy styrene; or ordinary aromatic epoxy compound such as styrene oxide may be incorporated in the ink in addition to the aforementioned alicyclic epoxy compound and aliphatic epoxy compound.

Further, in a situation where high speed printing of several tens meters per minute for example is demanded or where the resistance to solvent is required, it is possible to overcome such a situation by using an aromatic oxetane compound. When aromatic oxetane compound is employed as a major component however, the viscosity of the inkjet ink may be remarkably increased. In order to overcome such a problem, it is preferable to additionally incorporate an alicyclic or aliphatic epoxy compound and/or bivalent or multivalent aliphatic or alicyclic oxetane compound. This aliphatic oxetane compound may be formed of a polyalkylene oxide structure containing ether linkage in part of the aliphatic structure thereof. With respect to mixing amount of the aromatic or aliphatic oxetane compound, it is preferable, in view of transferability and viscosity as desired, to employ it at an amount of 0 to 40% by weight. On the other hand, in view of solvent resistance, the mixing amount of the aromatic or aliphatic epoxy compound should preferably be confined to not more than 50% by weight. Further, in view of promoting the curing of ink, a total quantity of the oxetane compound in the ink should preferably be at least 40% by weight or more, and furthermore, in view of optimizing the cured hardness of ink, a total quantity of the compounds having an alicyclic skeleton and an aromatic skeleton should preferably be at least 30% by weight or more of the ink.

If the mixing amount of these compounds fall outside these ranges, it may become difficult to obtain an ink which is capable of satisfying all of the properties such as curing rate, transcribing performance, discharge performance, solvent resistance, etc.

When a printed matter is required to be resistive to a solvent of high solubility, the mixing amount of the aromatic oxetane compound may be increased over the aforementioned range. Since the viscosity of ink increases due to this increased content of the oxetane compound, it is desirable to employ a combination of low viscosity compounds such as a compound having oxetane on the acrylic side chain or a vinyl ether compound.

As for the bivalent or multivalent aliphatic or alicyclic oxetane compounds, specific examples thereof include compounds having an alicyclic group into which at least one oxetane-containing group is introduced such as di[1-ethyl(3-oxetanyl)]methyl ether, 3-ethyl-3-(2-ethylhexyloxymethyl) oxetane, [(1-ethyl-3-oxetanyl)methoxy]cyclohexane, bis[(1-ethyl-3-oxetanyl)methoxy]cyclohexane and bis[(1-ethyl-3-oxetanyl)methoxy]norbornane. It is also possible to employ ether compounds comprising aliphatic polyhydric alcohol such as ethylene glycol, propylene glycol and neopentyl alcohol, to which oxetane-containing alcohol such as 3-ethyl-3-hydroxymethyl oxetane is dehydrocondensed.

Specific examples of the oxetane compounds comprising an aromatic skeleton include 1,4-bis[(1-ethyl-3-oxetanyl) methoxy]benzene, 1,3-bis[(1-ethyl-3-oxetanyl)methoxy] benzene, 4,4'-bis[(3-ethyl-3-oxetanyl)methoxy]biphenyl, and phenol novolac oxetane.

Among these compounds, [(1-ethyl(3-oxetanyl)]methyl ether is more preferable for use since this compound is low in viscosity. The employment of acrylic compound or methacrylic compound having oxetane group on their side chain is also effective in suppressing the increase of viscosity and in obtaining effect of accelerating the curing of ink as in the case of oxetane compound.

In order to enhance, in addition to the enhancement of curing speed and solvent resistance of printed images, cure hardness and to lower the viscosity of ink, it is preferable to incorporate vinyl ether compounds represented by the following general formula (4) in the inkjet ink. These vinyl ether compounds may be employed singly or in combination of two or more.

A vinyl ether compound which is bonded to methylene group of aliphatic glycol derivatives or of cyclohexane dimethanol is well known. Since the polymerization reaction of this vinyl ether compound is greatly obstructed by the presence of pigment, it has been considered difficult to incorporate it as a component for ink. Whereas, in the case of vinyl ether compounds represented by the following general formula (4), vinyl ether group is directly bonded to the terpenoid skeleton or aromatic skeleton. Due to this structure, even if this vinyl ether compound is included in ink together with pigment, the ink would indicate excellent curing properties.

In order to sustain thermoplasticity of ink, the mixing amount of the aforementioned vinyl ether compounds should preferably be confined to not more than 50% by weight based on a total weight of the inkjet ink. However, in order to secure higher solvent resistance and increased hardness on the sacrifice, in some extent, of thermoplasticity, all of the acid-polymerizable compound to be employed as a solvent may be constituted by these vinyl ether compounds.

$$R_{13}\text{-}R_{14}\text{-}(R_{13})_k \qquad (4)$$

Wherein $R_{13}(s)$ is a group selected from vinyl ether group, a group having a vinyl ether skeleton and hydroxyl group wherein at least one of $R_{13}(s)$ is a group having a vinyl ether skeleton; $R_{14}$ is a (p+1)-valent group selected from alicyclic skeleton, cyclic ether compound and a skeleton having an aromatic ring; and p is a positive integer including zero.

As for the specific examples of the (p+1)-valent organic group $R_{14}$, they include (p+1)-valent groups containing benzene ring, naphthalene ring and biphenyl ring; and (p+1)-valent groups that can be derived from an alicyclic skeleton such as cycloalkane skeleton, norbornane skeleton, adamantane skeleton, tricyclodecane skeleton, tetracyclododecane skeleton, terpenoid skeleton or cholesterol skeleton.

More specifically, the specific examples of the (p+1)-valent organic group $R_{14}$ include compounds comprising alicyclic polyol or phenol derivatives such as cyclohexane (poly) ol, norbornane (poly)ol, tricyclodecane (poly)ol, adamantane (poly)ol, benzene (poly)ol, naphthalene (poly)ol, anthracene (poly)ol and biphenyl (poly)ol, wherein hydrogen atom of the hydroxyl group in these polyols is substituted by vinyl group. It is also possible to employ a compound consisting of a polphenol compound such as polyvinyl phenol or phenol novolac wherein hydrogen atom of the hydroxyl group thereof is substituted by vinyl group. There will be no problem even if these compounds mentioned above are such that some of hydroxyl groups are left remained or methylene group constituting the alicyclic skeleton is partially substituted by ketone group. These substituted compounds may be preferable in reducing the volatility thereof.

Especially, since cyclohexyl monovinyl ether compound is highly volatile, at least cyclohexane ring thereof should preferably be oxidized into cyclohexanone ring if cyclohexyl monovinyl ether compound is to be employed.

Among these compounds, a cyclic ether compound having a substituent group containing a vinyl ether structure is more preferable. In terms of curability, a cyclic ether skeleton having not only five-membered ring skeleton but also a crosslinking structure is most preferable. Such a vinyl ether compound can be synthesized by using a method wherein a corresponding alcohol compound and vinyl ether source such as vinyl acetate are employed as starting materials and the alcohol is substituted so as to form vinyl ether by using a catalyst such as iridium chloride (J. Am. Soc. vol. 124, No. 8, 1590-1591 (2002)).

Among these compounds mentioned above, epoxy compounds, oxetane compounds and vinyl ether compounds each having a skeleton found abundantly in nature such as terpenoid skeleton or norbornane skeleton are more preferable in view of cost.

As for the dispersant to be employed according to one embodiment of the present invention, it is possible to employ a radically polymerizable compound other than the aforementioned photo-cation polymerizable compounds. This radically polymerizable compound can be mixed with a photo-acid generating agent so as to employ it as a solvent for a photo-curable inkjet ink.

As for the radically polymerizable compound, it is possible to employ generally known monoacrylic, polyacrylic or methacrylic ester compounds for example. As for the monoacrylate, an acrylate or methacrylate compound having terpenoid skeleton attached to the ester side chain thereof can be preferably employed since these monoacrylate compounds are excellent in safety.

For example, acrylic compounds disclosed in JP Patent Laid-open Publication (Kokai) 08-82925 (1996) can be suitably employed as monomers. As for specific examples of such acrylic compounds, they include ester compounds which can be obtained by epoxidizing the double bond of terpen having an unsaturated linkage and then acrylic acid or methacrylic acid is added thereto, wherein specific examples of terpen include myrcene, carene, ocimene, pinene, pinene, limonene, camphene, terpinolene, tricyclene, terpinene, fenchene, phellandrene, sylvestrene, sabinene, dipentene, bornene, isopregol, carvone, etc. Alternatively, it is also possible to employ ester compounds to be derived from acrylic acid or methacrylic acid and alcohols originated from terpene such as citronellol, pinocampheol, geraniol, phentyl alcohol, nerol, borneol, isoborneol, linalol, menthol, terpineol, thujyl alcohol, citroneral, ionone, irone, cineral, citral, pinol, cyclocitral, carvomenthone, ascaridole, safranal, piperithol, menthenemonol, dihydrocarvone, carveol, sclareol, manool, hinokiol, ferruginol, totarol, sugiol, farnesol, patchouli alcohol, nerolidol, carotol, cadinol, lantheol, eudesmol, phytol, etc. It is also possible, additionally for the purpose of improving the adhesion, to employ alkyl acrylate, hydroxyethyl acrylate, or ordinary acrylate or methacrylate compounds such as acrylate having alicyclic epoxy group attached to its side chain.

In order to enhance the reactivity of the aforementioned monomers, it is possible to employ also polyfunctional acrylates. For example, it is possible to employ polyacrylate compounds of polyhydric alcohol compounds, polyacrylate compounds of polyhydric aromatic alcohols, polyacrylate compounds of polyhydric alicyclic alcohols, and styrene compounds having a substituent group. As for the specific examples of such monomers, they include, for example, di- or polyacrylate compounds of ethylene glycol, polyethylene glycol, propylene glycol, glycerin, neopentyl alcohol, trimethylol propane, pentaerythritol, and vinyl alcohol-based oligomers; urethane acrylate compounds; di- or polyacrylate compounds of phenol, cresol, naphthol, bisphenol, novolac-based condensation compounds of these aromatic alcoholic compounds, and vinyl phenolic oligomers; and di- or polyacrylate compounds of di- or polyhydroxyl compounds where these alcohols are hydrogenated such as cyclohexane, hydrogenated bisphenol, decahydronaphthalene alicyclic compounds, terpene-based alicyclic compounds, dicyclopentane and tricyclodecane-based alicyclic compounds. It is also possible to suitably employ compounds where a group containing vinyl ether is substituted for an acrylate moiety of the aforementioned compounds.

As for specific examples of dihydric acrylate, the following compounds can be employed. Namely, they include 1,4-butane diol diacrylate, 1,6-hexane diol diacrylate, 1,9-nonane diol diacrylate, 2-n-butyl-2-ethyl-1,3-propane diol diacrylate, dipropylene glycol diacrylate, tripropylene glycol diacrylate, tetraethylene glycol diacrylate, triethylene glycol diacrylate, 3-methyl-1,5-pentane diol diacrylate, a mixture of 2-methyl-1,8-octane diol diacrylate and 1,9-nonane diol diacrylate, dimethylol tricyclodecane diacrylate, hydroxypivalic acid neopentylglycol diacrylate, polytetramethylene glycol diacrylate, trimethylol propane triacrylate, pentaerythritol triacrylate, trimethylol propane EO-added triacrylate, EO-modified trimethylolpropane triacrylate, caprolactone-modified trimethylolpropane triacrylate, glycerin PO-added triacrylate, glycerin propoxy triacrylate, tris-acryloyloxyethyl phosphate, pentaerythritol tetraacrylate, pentaerythritolethoxy tetraacrylate, polyethylene glycol diacrylate, and urethane acrylate.

Further, the following products can be also employed. Namely, they include V#195, V#230, V#260, V#265, V#310HP, V#335HP, V#295, V#300, V#360, V#GPT, V#3PA and V#400 (trade name; all available from Ohsaka Yuki Kagaku Industries Ltd.); HDODA, DPGDA, TPGDA, PEG300DA, PEG400DA, Ebecryl 11, IRR 214, TMPTA, PETIA, Ebecryl 160, Ebecryl 2047, OTA 480, Ebecryl 53, Ebecryl 40 (trade name; all available from Daicel UCB Co., Ltd.); Light Acrylate 1.6HX-A, Light Acrylate 1.9ND-A, Light Acrylate BEPG-A, Light Acrylate 3EG-A, Light Acrylate 4EG-A, Light Acrylate 9EG-A, Light Acrylate 14EG-A, Light Acrylate NP-A, Light Acrylate MPD-A, Light Acrylate MOD-A, Light Acrylate DCP-A, Light Acrylate HPP-A, Light Acrylate PTMGA-250, Light Acrylate TMP-A, Light Acrylate PE-3A, Light Acrylate TMP-3EO-A, Light Acrylate 6EO-A, and Light Acrylate PE-4A (trade name; all available from Kyouei Kagaku Co., Ltd.).

In addition to the aforementioned compounds, a compound having an olefin structure on its substituent group may be also employed as a radically polymerizable compound. Generally, an aliphatic compound having olefin in its structure is poor in polymerization, so that compounds having, as a substituent group, an olefin skeleton or styrene skeleton having a ring structure of distorted structure such as 5-membered ring can be suitably employed. For example, monomer compounds having any one of the aforementioned series of alcohol, maleic acid or norbornene skeleton, as well as monomer compounds comprising styrene or hydroxy styrene where any of hydrogen atoms is converted to a substituent group having other kind of aliphatic hydrocarbon such as terpenoid skeleton are preferable for use.

In order to employ the aforementioned radically polymerizable compounds as a solvent, it is preferable to include a photo-radical generating agent in the inkjet ink. As for the photo-radical generating agent, it is possible to employ a photo-radical polymerization initiator such as Michler's ketone and benzophenone, which are available in the market as Irgacure or Darocure (trade name; Nagase Sangyo Co., Ltd.).

More specifically, specific examples of the photo-radical generating agent include benzophenone and acetophenone derivatives or benzoin alkyl ether or ester, for example α-hydroxy- or α-aminocetophenone, 4-aroyl-1,3-dioxorane, benzyl ketal, 2,2-diethoxyacetophenone, p-dimethyl aminoacetophenone, p-dimethyl aminopropiophenone, benzophenone, 2-chlorobenzophenone, pp'-dichlorobenzophenone, pp'-bisdiethyl aminobenzophenone, Michler's keton, benzyl, benzoin, benzyldimethyl ketal, tetramethyl thiuram monosulfide, thioxanthone, 2-chlorothioxanthone, 2-methylthioxanthone, azobisisobutyronitrile, benzoin peroxide, di-tert-butyl peroxide, 1-hydroxycyclohexyl phenylketone, 2-hydroxy-2-methyl-1-phenyl-1-on, 1-(4-isopropylphenyl)-2-hydroxy-2-methylpropane-1-on, methylbenzoyl formate, benzoin isopropyl ether, benzoin methyl ether, benzoin ethyl ether, benzoin ether, benzoin isobutyl ether, benzoin n-butyl ether, and benzoin n-propyl; 1-hydroxy-cyclohexyl-phenyl ketone, 2-benzyl-2-dimethylamino-1-(4-morpholinophenyl)-butanone-1,1-dydroxy-cyclohexyl-phenyl-ketone, 2,2-dimethoxy-1,2-diphenylethan-1-on, bis($\eta^5$-2,4-cyclopentadien-1-yl)-bis(2,6-difluoro-3-(1H-pyrol-1-yl)-phenyl)titanium, bis(2,4,6-rimethylbenzoyl)-phenylphosphine oxide, 2-methyl-1[4-(methylthio)phenyl]-2-morpholinopropan-1-on, 2-hydroxy-2-methyl-1-phenyl-propan-1-on (Darocure 1173), bis(2,6-dimethoxybenzoyl)-2,4,4-trimethyl-pentylphosphine oxide, 1-[4-(2-hydroxyethoxy)-phenyl]-2-hydroxy-2-methyl-1-propan-1-on monoacylphosphine oxide, bisacylphosphine oxide, bisacylphosphine oxide or titanocene, fluorescein, anthraquinone, thioxanthone or xanthone, lophine dimer, trihalomethyl compound or dihalomethyl compound, activated ester compound and orgnoboron compound.

These photo-radical generating agent are available from the market in the name of Irgacure 379, Irgacure 127, Irgacure 369 and Irgacure 907 (trade name; Ciba-Geigy Co., Ltd.). In addition to these compounds, a polymerization promoter such as diethanol amines may be included in the ink.

The aforementioned pigment dispersion is mixed with an ionic compound and then diluted with a diluting solvent, thus obtaining an inkjet ink according to one embodiment of the present invention.

As for the diluting solvent, it is possible to employ the organic dispersants already described above. Further, as for the ionic compound, soluble salts or organic salts such as carbonate which are designed to be included for the stabilization of ink or included in a thickener, an anti-sagging agent or defoaming agent can be employed. It is also possible to employ organic or inorganic salts such as metal soap to be used as a surfactant or a dispersing agent. The mixing amount of the ionic compound may generally be 0.01 to 20% by weight based on a total weight of the inkjet ink.

The inkjet ink according to one embodiment of the present invention may be considered as a photo-curable liquid ink wherein onium salts can be most suitably employed as a photo-acid generating agent which is capable of generating an acid as they are irradiated with light. Since a relatively large quantity of organic salts are included in an onium salt compound, onium salt compound is suited for use as an ionic compound in one embodiment of the present invention. The ionic compound also acts as a photo-cation polymerization initiator.

Examples of onium salts useful in this case are diazonium salts, phosphonium salts, sulfonium salts and iodonium salts having, as a counter ion, fluoroboric acid anion, hexafluoroantimonic acid anion, hexafluoroarsenic acid anion, trifluoromethane sulfonate anion, paratoluene sulfonate anion or paranitrotoluene sulfonate anion.

More specifically, the following compounds represented by the following chemical formulas can be employed as an onium salt.

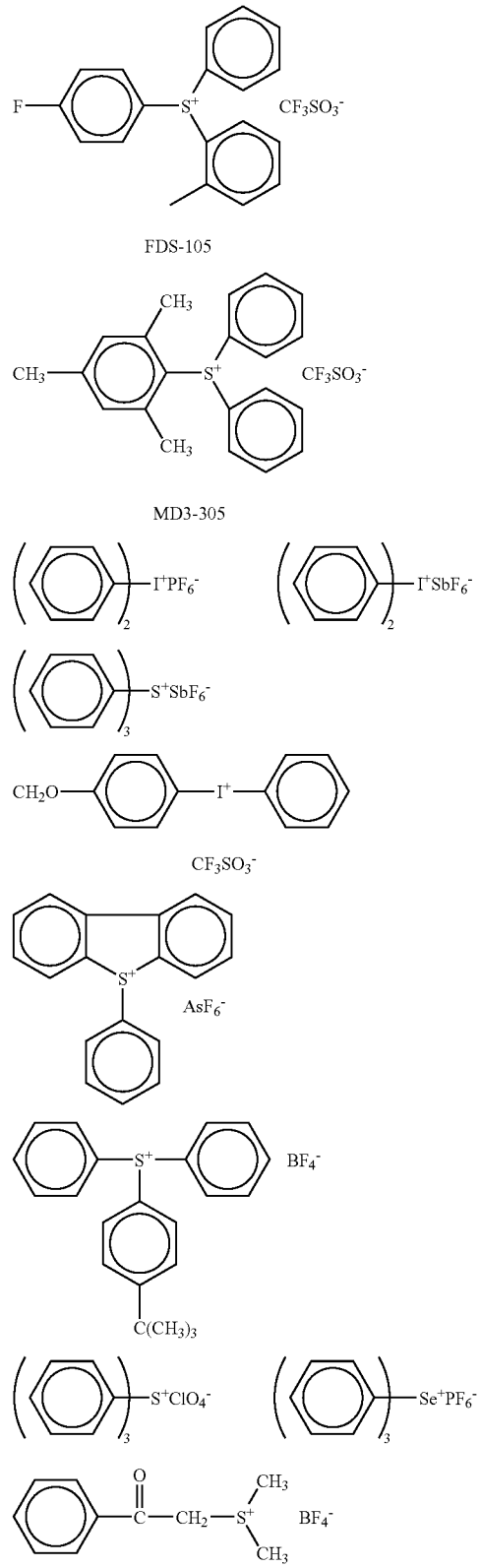

-continued

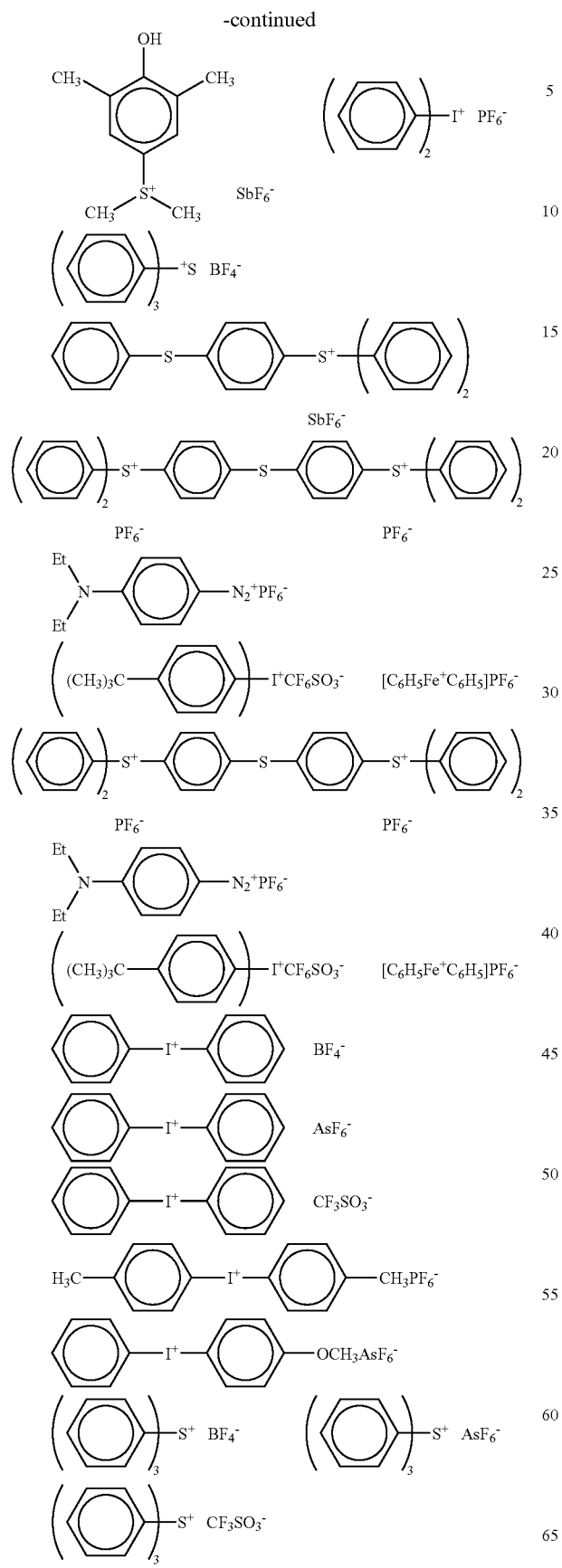

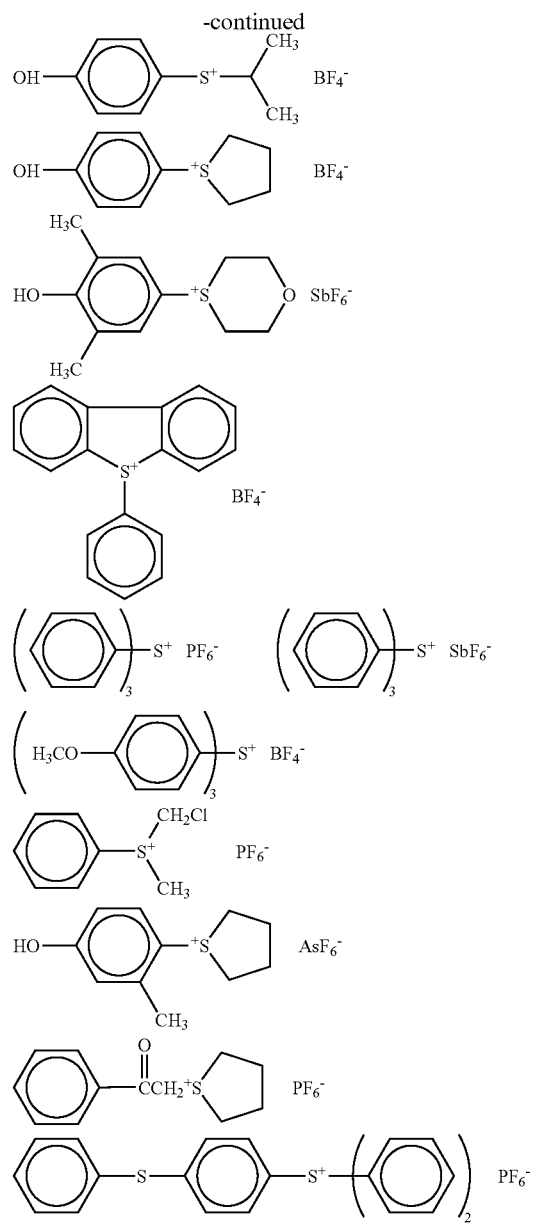

Specific examples of onium salts available in the market are, for example, MPI-103 (CAS. NO. [87709-41-9]; Midori Kagaku Co., Ltd.), BDS-105 (CAS. NO. [145612-66-4]; Midori Kagaku Co., Ltd.), NDS-103 (CAS. NO. [110098-97-0]; Midori Kagaku Co., Ltd.), MDS-203, (CAS. NO. [127855-15-5]; Midori Kagaku Co., Ltd.), DTS-102 (CAS. NO. [75482-18-7]; Midori Kagaku Co., Ltd.), DTS-103 (CAS. NO. [71449-78-0]; Midori Kagaku Co., Ltd.), MDS-103 (CAS. NO. [127279-74-7]; Midori Kagaku Co., Ltd.), MDS-105 (CAS. NO. [116808-67-4]; Midori Kagaku Co., Ltd.), MDS-205 (CAS. NO. [81416-37-7]; Midori Kagaku Co., Ltd.), BMS-105 (CAS. NO. [149934-68-9]; Midori Kagaku Co., Ltd.), TMS-105 (CAS. NO. [127820-38-6]; Midori Kagaku Co., Ltd.), UVACURE 1591 (Daicel UCB Co, Ltd.); UVI-6992 and 6976 (Dow Chemical Co., Ltd.), Esacure-1064 (Lamberty Co., Ltd.); and Irgacure 250 (Ciba-Geigy Co., Ltd.).

Among the aforementioned onium salts, sulfonium salt and iodonium salt are more excellent in stability. However, it is known that due to the process in the manufacture of these onium salts, these onium salts are unavoidably formed of a mixture comprising monovalent salt (a salt consisting of monovalent cation and one anion) and up to about 75% of not less than 2-valent salt (a salt consisting for example of bivalent cation and two anions), so that the products of these onium salts available in the market are also formed of such a mixture of onium salts. It is known that when a multi-valent salt is included in the inkjet ink, the photosensitive wavelength of the ink is enabled to shift toward longer wavelength side, thereby generally rendering the ink to become higher in sensitivity. With a view to take advantage of this merit, a salt of not less than 2-valency is sometimes deliberately incorporated in the ink. Uvacure 1591 (Daicel UCB Co, Ltd.), UVI-6992 and 6976 (Dow Chemical Co., Ltd.), Esacure-1064 (Lamberty Co., Ltd.) and Irgacure 250 (Ciba-Geigy Co., Ltd.) are produced based on such a concept. However, multi-valent salts may badly affect the flocculation stability of the pigment dispersion to be used in the inkjet ink where especially fine particles are required. More specifically, the employment of multi-valent salts may lead to the generation of a weak linkage between pigment particles and a dispersant, thereby giving rise to the generation of gelling or flocculation. Therefore, the restriction of the presence of these multi-valent salts in inkjet ink to as minimum as possible would generally lead to the improvement of the dispersion stability of pigment as well as the delivery performance of inkjet ink.

Therefore, generally speaking, the content of multi-valent onium salt should preferably be confined to not more than 20% by weight based on a total weight of every kinds of onium salts. More preferably, the content of multi-valent onium salt should be confined to not more than 5% by weight. Most preferably, multi-valent onium salt should not be included in the inkjet ink.

Since fluorophosphates salt of aryl sulfonium and fluorophosphates salt of aryl iodonium are very excellent in enhancing flocculation stability of coloring pigments among the aforementioned onium salts, the employment of these fluorophosphates salts is preferable. Even in the case of monovalent onium salts, they are capable of gradually substituting, with time, for a terminal amine resin employed as a dispersant if the dispersant become insufficient. Therefore, it is desirable that onium salts should be constructed such that they cannot be easily moved into the joint portion between the surface of pigment and the terminal of dispersant. This can be realized by using an onium salt compound having in its structure a relatively large substituent group. Further, since the adsorption of ion onto the surface of pigment would be minimized by steric hindrance, the benzene ring in the onium salt should preferably have an organic group having 1 to 20 carbon atoms. It is further preferable that not less than 50% of benzene ring is provided with 4 to 20 carbon atoms. If the benzene ring is regulated in this manner, the scattering of decomposed matters into air would be suppressed during the photo-reaction in addition to the improvement of dispersion stability, thereby making it possible to enhance the safety. Further, since these compounds are more excellent in solubility to a solvent, the phenomenon of the precipitation of salts in the ink can be also suppressed. Still more, the generation of particles several microns in size that may become a cause for discharge failure can be advantageously minimized.

Since the employment of monovalent onium salts leads to the shift of photosensitive wavelength to a shorter wavelength side, the ink containing the monovalent onium salts will exhibit a tendency of deteriorating the photosensitivity thereof. When the monovalent onium salts include in their structures an aromatic substituent group having VI group elements such as sulfur or oxygen in its heterocyclic group or as a linking group, the aforementioned problem would be overcome and hence the inclusion of such an aromatic substituent group is desirable.

An onium salt comprising a relatively large organic group in its structure as shown in the following general formula (1) or (2) is advantageous in the respects that it is excellent in dissolution stability and dispersion stability.

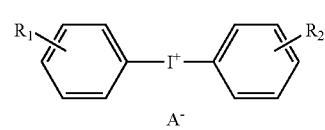

(1)

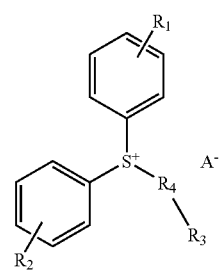

(2)

Herein, $A^-$ is fluorophosphate anion; $R_1$, $R_2$ and $R_3$ may be the same or different and at least one of them is an organic group having 4 to 20 carbon atoms and the rest are an organic group having 1 to 20 carbon atoms and including hydrogen atom; and $R_4$ is a bivalent aromatic substituent group or a bivalent aromatic substituent group containing a VI atom therein.

As for specific examples of the organic group to be introduced into $R_1$, $R_2$ and $R_3$, they include alkyl group having 4 to 20 carbon atoms such as propyl, butyl, hexyl, heptyl, octyl, nonyl, decanyl, etc.; alkyloxy group having 4 to 20 carbon atoms such as propylox, butyloxy, hexyloxy, heptyloxy, octyloxy, nonyloxy, decanyloxy, etc.; and a substituent group having 4 to 20 carbon atoms and polyethylene oxide skeleton where ethylene glycol is dehydrocondensed.

As for specific examples of the bivalent aromatic substituent group to be introduced into $R_4$, they include a group having a phenylene skeleton such as phenylene and biphenylene; a group having a phenylene sulfide skeleton such as phenylene sulfide and phenylene disulfide; a group having a thiophene skeleton such as benzothiophenylene, thiophenylene and bithiophenylene; and a group having a furan skeleton such as furanylene and benzofuranylene.

The aforementioned onium salts are known to suppress the generation of harmful by-product such as benzene during the process of photo-reaction. When a dispersion containing these onium salts is employed as an inkjet ink, it would become very advantageous in terms of environment and safety.

The mixing amount of the photo-acid generating agent (ionic compound) in the inkjet ink may be suitably determined based on the acid-generating efficiency of the photo-acid generating agent to be employed and on the quantity of coloring component to be added. In one embodiment of the present invention, the photo-acid generating agent is incorporated in the inkjet ink, based on the sensitivity, at an amount of 1 to 10% by weight in general, preferably 2 to 8% by weight, more preferably 2 to 6% by weight based on 100% by weight of the entire solvents to be polymerized by the effect of acid in the inkjet ink. However, the employment of a sensitizing agent concurrent with the photo-acid generating agent is preferable in view of improving the dispersion stability of pigment and of minimizing the corrosion of piping and head members and also in view of reducing the mixing amount of the photo-acid generating agent to the range of about 2 to 4% by weight.

As for specific examples of the sensitizing agent, they include acridine compounds, benzofuravins, perylene, anthracene, thioxantone and laser dyes. Among them, a compound formed of dihydroanthracene where hydrogen atom thereof is substituted by an organic group or thioxantone derivatives are expected to exhibit excellent effects. The mixing amount of the sensitizing agent (dye) may be generally 20 to 100% by weight, more preferably 30 to 60% by weight based on the photo-acid generating agent.

If the mixing amount of the photo-acid generating agent is less than 2% by weight based on 100% by weight of the solvent, the sensitivity of the inkjet ink would be degraded. On the other hand, if the mixing amount of the photo-acid generating agent exceeds 10% by weight, the increase in viscosity with time of the ink would become prominent due to the deterioration of dispersion or to the dark reaction of dispersant, thus degrading not only the coating property of ink but also the hardness of ink film after the photo-curing thereof. Furthermore, it may lead to the generation of corrosion of the piping or head members of the recording apparatus.

The aforementioned onium salts may be employed in combination with a nonpolar photo-acid generating agent which is capable of generating a relatively strong acid of different kind. In this case, the mixing ration of the onium salt can be reduced, thus making it possible to further suppress the flocculation with time of the pigment particles. As for specific examples of such a nonpolar photo-acid generating agent, they can be preferably selected from the group consisting of sulfonyl compounds, sulfonate compounds, sulfamide compounds and organic halogen compounds. Among them, compounds which are capable of generating a strong acid such as fluoromethane sulfonic acid, hydrochloric acid or bromic acid are preferable.

More specifically, it is possible to employ a sulfamide compound such as trifluoromethane sulfonamide of N-hydroxynaphthalimide, and organic halide compounds such as triazine halide compound. The mixing amount of these onium salts and nonpolar photo-acid generating agent may preferably be 0.3-2% by weight and 2-10% by weight, respectively, based on 100% by weight of the solvent.

A basic compound such as amine and aniline derivatives may be incorporated, as a viscosity-stabilizing agent, to the inkjet ink of the present invention. Further, a small quantity of nonionic or ionic surfactant or antistatic agent may be incorporated into the inkjet ink in order to enhance the dispersibility of pigments, etc. Further, an organic solvent useful in the preparation of raw materials, such for example as methylethyl keton, propylene glycol solvent, ethyl lactate, xylene, may be included in the inkjet ink as far as the mixing amount thereof is limited to very small in quantity. Further, for the purpose of obtaining a desired printed matter, a small quantity of organic solvent may be included in the inkjet ink. In this case, in viewpoint of safety, the employment of water, alcohols and petroleum components such as isoper and terpene is desirable.

In the case of the pigment dispersion to be included in the inkjet ink according to one embodiment of the present invention, the zeta-potential of pigment particles will be regulated to different values depending on the kind of pigment. Namely, −10 mV or more in the case of black pigment; +30 mV or more in the case of cyan pigment; −15 mV or more in the case of yellow pigment; and +40 mV or more in the case of white pigment. More preferably, a positive value in the case of black pigment; +40 mV or more in the case of cyan pigment; −1 mV or more in the case of yellow pigment; and +50 mV or more in the case of white pigment. These values of zeta potential are ones relative to an organic dispersant or to at least one component of the organic dispersant. The upper limit of the zeta potential is regulated to not more than 100 mV irrespective of the kinds of pigment. More preferably, the upper limit of the zeta potential should be not more than 80 mV. It has been found out through storage tests conducted under the condition of high temperatures by the present inventors that when the zeta potential falls outside this range, not only the particle diameter but also the viscosity would be increased, thus badly deteriorating the storage properties of ink.

The measurement of zeta potential can be performed by the electrophoresis laser Doppler method using a measuring cell for nonaquous solvent and ELS-8000 (Ohtsuka Denshi Co., Ltd.). However, the zeta potential can be also measured by other kinds of electrophoresis method, an ultrasonic potential method, an electromotive acoustic method, etc. Incidentally, since the measurement is performed in a nonaquous solvent system, the formula of Huckel can be utilized when the zeta potential is to be measured from the electrophoretic mobility of ink.

Further, the solvent to be employed in the measurement of zeta potential should preferably be selected from dispersants to be employed in the pigment dispersion and those comprising the dispersants as a major component. More specifically, the aforementioned polymerizable compounds can be employed singly or, if a mixture of a plurality of aforementioned polymerizable compounds is to be employed, they should be mixed in the same mixing ratio as they are employed in preparing the ink.

The measurement of zeta potential should preferably be performed at least 24 hour s, more preferably at least 3 days after the manufacture of ink through the mixing of compounds. The reason for this is that generally, it takes about 3 days for rendering the adsorption of the dispersant or other kinds of ionic components onto the pigment to settle down into a state of equilibrium after the mixing of materials, thus enabling the zeta potential to stabilize.

Although it differs depending on the kind of pigment to be employed, the zeta potential of pigment particles in the aforementioned pigment dispersion would fall within the range of −20 to −5 mV when only these components are measured. More specifically, about −30 to −5 mV in the case of black pigment; about −20 to +20 mV in the case of cyan pigment; and about −30 to −15 mV in the case of yellow pigment. In order to control the zeta potential of ink appropriately, it is desirable to incorporate an additive into the ink.

In order to adjust the zeta potential of ink so as to confine it to the aforementioned appropriate range, the incorporation of a resinous polymer dispersing agent having a basic terminal into the ink as the second resinous dispersing agent is effective. As for the polymer dispersing agent to be employed as the second resinous dispersing agent, it should preferably be selected from those which have a basic group such as amino group on their terminals and which are more or less excellent in affinity to the first resinous dispersing agent. It is more preferable to select, as the second resinous dispersing agent, from those which are capable of creating dispersion stability through the adsorption or interaction with an ionic compound (to be discussed hereinafter) and through the repulsive force thereof with respect to the first resinous dispersing agent entirely covering the pigment particles.

As for the second resinous dispersing agent satisfying the aforementioned conditions, it is possible to employ, generally, polyolefin, polyester and epoxy resin each having amino terminal even through it cannot be definitely determined because of the combination thereof with the first resinous dispersing agent. More specifically, it is possible to employ polyepoxy compounds which can be derived from a reaction between a linear polymer having a number average molecular weight of 500-50,000 and carboxyl group on one end thereof and an organoamino compound having one secondary amino group and which have amine value of 5-200 mgKOH/g and a number average molecular weight of 1,000-100,000. it is also possible to employ, as the second resinous dispersing agent, polyallylamine derivatives which can be derived from a reaction between polyallyl amine and at least one kind of compound selected from polyester having a free carboxyl group, a co-condensed product (polyester amide) of polyamide and amide, and a co-condensed product (polyester amide) of ester and amide.

The following compounds can be also employed as the second resinous dispersing agent. Namely, they are polyester polymers which can be derived from a reaction between a compound having a number average molecular weight of 500-50,000 and carboxyl group on one end thereof and a compound having one secondary amino group and which have amine value of 5-200 mgKOH/g and a number average molecular weight of 1,000-100,000; and polyester polymers which can be derived from a reaction between polyester and acrylic polymer having a tertiary amino group and/or a basic nitrogen-containing heterocyclic group and which have amine value of 10-200 mgKOH/g and a number average molecular weight of 1,000-100,000.

If the amine value of these dispersing agents is too small, it is impossible to secure a sufficient adsorptive force to pigment. On the other hand, if the amine value of these dispersing agents is too large, it would become difficult to enhance the dispersibility due to the generation of flocculation among the pigment particles.

As for specific examples of the polyepoxy compound, they include, for example, polyglycidyl ether compounds such as ethyleneglycol diglycidyl ether, polyethyleneglycol diglycidyl ether, propyleneglycol diglycidyl ether, polypropyleneglycol diglycidyl ether, neopentylglycol diglycidyl ether, 1,6-hexanediol diglycidyl ether, glycelol polyglycidyl ether, trimethylolpropane polyglycidyl ether, diglycelol polyglycidyl ether, polyglycelol polyglycidyl ether, and sorbitol polyglycidyl ether. Further, it is also possible to employ glycidyl ester-containing acrylic polymer which can be derived from the copolymerization between glycidyl(metha)acrylate and a polymerizable vinyl monomer other than the glycidyl (metha)acrylate. In this case, methylmethacrylate and styrene can be employed as the aforementioned polymerizable vinyl monomer.

As for specific examples of the aforementioned second resinous dispersing agent, they are available in the market including Ajisper PB711, Ajisper PB821, Ajisper PB822 and Ajisper PN411 (all available from Ajinomoto Finetechno Co., Ltd.), PLAAD-ED221 (Kusumoto Co., Ltd.), and Solspers 32000 (Avecia).

The mixing amount of the second resinous dispersing agent should preferably be confined within the range of 2 to 60% by weight based on the pigment. If the mixing amount of the second resinous dispersing agent falls outside this range, it may become difficult to obtain a dispersion having a suitable degree of viscosity and being stable in dispersion. Namely, if the content of resin is too small, the dispersion stability thereof would be badly degraded. On the other hand, if the content of resin is too large, the resultant dispersion would become viscous, thus degrading the delivery stability of ink especially when the ink is used by inkjet system. A preferable range of the amount (weight) of the resin for securing an optimal range of zeta potential may differ depending on the kind of pigment.

For example, in the case of carbon black, the mixing amount thereof should preferably be confined within the range of 5 to 40% by weight based on the weight of pigment. In the case of color pigments, for example, in the case of yellow pigment, the mixing amount thereof should preferably be confined within the range of 15 to 60% by weight based on the weight of pigment; and in the case of cyan pigment, the mixing amount thereof should preferably be confined within the range of 20 to 60% by weight based on the weight of pigment. When the mixing amount of dispersing agent is regulated in this manner, the zeta potential of ink can be kept within the aforementioned appropriate range of value.

In the manufacture of the inkjet ink according to one embodiment of the present invention, attention should be paid to the mixing order of each component. Generally, an ionic compound, especially an ionic compound containing a polyvalent salt acts to degrade the stability of colloid dispersion, thus giving rise to the generation of salting out and flocculation. When the second resinous dispersing agent is incorporated, the ionic compound is reacted with the second resinous dispersing agent, thereby enabling stable electric charge to generate on the surface of pigment particles. As a result, it becomes possible to obtain a stable pigment dispersion. Therefore, in order to enable the effects of the second resinous dispersing agent to exhibit sufficiently, the presence of this ionic compound is needed. When the second resinous dispersing agent is incorporated in the ink without accompanying the incorporation of this ionic compound, the resultant dispersion would, on the contrary, become unstable. In the worst case, flocculation may be caused to generate, thus solidifying the liquid entirely into a gel-like material.

Even if the ionic compound is singly incorporated after the pigment particles have been covered with the first resin dispersing agent, it would be impossible to secure a sufficiently stable state of dispersion. Likewise, even if the second resinous dispersing agent is singly incorporated in the ink after the pigment particles have been covered with the first resin dispersing agent, it would be difficult to secure a sufficiently stable state of dispersion.

In the manufacture of the inkjet ink according to one embodiment of the present invention, the second resinous dispersing agent and the photo-cation polymerization initiator should preferably be incorporated concurrently into the pigment dispersion where pigment particles are dispersed by using the first resin dispersing agent. By doing so, it is possible to sufficiently enhance the dispersion stability of pigment particles. Even if the second resinous dispersing agent and the photo-cation polymerization initiator are not concurrently existed, the flocculation of pigment particles due to unstable dispersion would not take place within a short period. Therefore, the second resinous dispersing agent and the photo-cation polymerization initiator may not necessarily be concurrently incorporated into the ink if they can be put together within a short period. More specifically, as long as the difference in timing of incorporating them can be confined within 24 hours, the flocculation of pigment particles would not take place.

As described above, by regulating the zeta potential to a suitable range under the condition where the equilibrium of adsorption of ionic components is reached after finishing the mixing of ink components, the stability of ink can be greatly enhanced. Further, even in a state of equilibrium during the storage of ink at a temperature of 65° C., the stability of ink can be enhanced by regulating the value of zeta potential. It has been found out by the present inventors that an accelerated test corresponding to the storage of one year at normal temperature can be executed by storing an ink for ten days under a heated condition of 65° C. It can be assumed that by ensuring the stability of ink under this heated condition, the dispersion stability of ink can be enhanced. When the aging of ink is performed at a temperature of 65° C., the equilibrium of adsorption of ionic components can be reached within 24 hours, so that the zeta potential after 24 hours should preferably indicate a positive value. The reason for this can be explained as follows. Namely, due to the adsorption of ionic components in the inkjet ink according to one embodiment of the present invention, the surface electric potential changes to positive value. As a result, if the surface electric potential is negative or zero in electric potential even in a state of equilibrium, the effect of repulsion by the adsorption of ionic components would not be sufficiently exhibited.

The control of such a zeta potential can be achieved by the addition of the aforementioned second resinous dispersing agent.

As described above, the ink according to one embodiment of the present invention comprises a pigment dispersion, an ionic compound, and a resinous polymer dispersing agent as a second resinous dispersing agent; wherein the pigment dispersion comprises an organic dispersant formed of at least one kind of polymerizable compound, a pigment and a first resinous dispersing agent, and the zeta potential of the pigment to at least one component of the polymerizable compound in the organic dispersant is a positive value.

This ink can be manufactured by the following method. Namely, this method comprises the steps of: obtaining a pigment dispersion by dispersing the pigment in the organic dispersant by using the first resinous dispersing agent; adding an ionic compound to the pigment dispersion; adding the second resinous dispersing agent; and subjecting the resultant mixture to aging.

Incidentally, since the surface potential of pigment particles is influenced by the adsorption of the inonic component in the ink, the adjustment of zeta potential can be effected by suitably selecting the kind and mixing amount of an inonic compound such as photo-cation polymerization initiator.

The inkjet ink according to one embodiment of the present invention is used for recording an image by using an inkjet printing head wherein droplets of the ink are ejected from the printing head to a substrate. Although there is not any particular limitation with respect to the structure of printing head, the effects of this ink may become more prominent when electrodes are provided at the nozzle portion of the head or on the inner wall of the ink passageway of ink supply system, thereby making possible to apply an electric field to the ink.

The electric voltage to be imposed on the electrodes fluctuate repeatedly and the speed thereof may range from several kHz to several hundreds kHz. Therefore, the pigment particles provided with surface potential vibrates by the electric field to be given to the ink. Even in the organic solvent, migration generates due to the electric field to be generated from the surface potential provided to the pigment particles.

As a result, even the pigment particles vibrate due the vibration of electric field, thereby suppressing the flocculation of pigment particles.

It is preferable in the inkjet ink according to one embodiment of the present invention to control it so as to enable the surface of pigment particles to have an electric potential. When the printing head is constructed such that electrodes are provided at the nozzle portion thereof or on the inner wall of the ink passageway of ink supply system so as to apply an electric field to the ink, the effects of keeping the delivery stability of ink can be enhanced.

The inkjet ink according to one embodiment of the present invention can be used in the recording method as described below. Namely, this recording method comprises steps of: feeding an inkjet ink to an ink supply passageway; discharging the inkjet ink from an inkjet head to a recording medium; and curing the inkjet ink by irradiating light or electromagnetic radiation to the inkjet ink that has been discharged onto the recording medium; wherein the inkjet ink is given an electric field by electrodes in at least one location selected from the ink supply passageway and the inkjet head.

Next, the inkjet head to be employed in the present invention will be explained.

Figure 2:
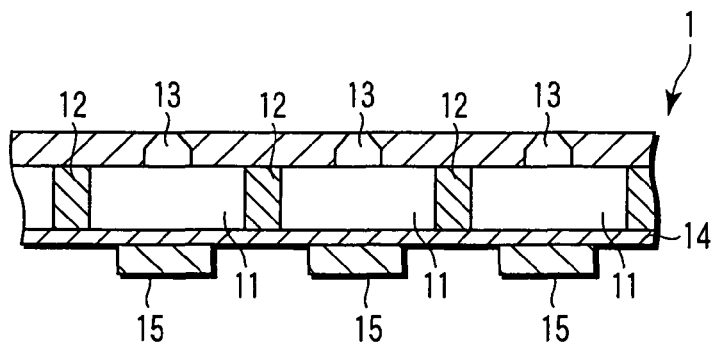
FIG. 2 is a cross-sectional view taken along the line A-A shown in FIG. 1.

FIG. 1 shows a main structure of an inkjet recording apparatus to be employed in the present invention. FIG. 2 shows a cross-sectional view taken along the line A-A of FIG. 1.

As shown in FIG. 1, the inkjet head 1 is constructed such that a plurality of pressure chambers 11 for accommodating ink are partitioned by a barrier wall 12 and each pressure chamber 11 is provided with a nozzle 13 for discharging droplets of ink. The bottom of each pressure chamber 11 is formed of a vibrating plate 14, below which a plurality of piezoelectric members 15 are fixed so as to correspond with each of the pressure chambers 11. The vibrating plate 14 and the piezoelectric members 15 are provided so as to constitute an actuator. The piezoelectric members 15 are electrically connected with the output terminal of a driving signal generating means 2.

The inkjet head 1 is further provided with a common pressure chamber 16 communicating with each of the pressure chambers 11. Ink is designed to be ejected from an ink supply means (not shown) via an ink supply port 17 into the common pressure chamber 16, thereby enabling the common pressure chamber 16, each of pressure chambers 11 and a nozzle 13 to be filled with ink. By filling the pressure chambers 11 and the nozzle 13 with ink, the meniscus of ink is created in the nozzle 13.

On the behind the common pressure chamber 16 is attached a temperature sensor 18 functioning as a temperature detecting means, thereby making it possible to detect the temperature of ink in the head. The information of temperature that has been detected by the temperature sensor 18 is fed to the driving signal generating means 2.

In the inkjet head 1 shown herein, when a driving signal generated from the driving signal generating means 2 is fed to the piezoelectric members 15, the vibrating plate 14 is displaced by the piezoelectric members 15, thereby fluctuating the capacity of the pressure chambers 11. As a result, a pressure wave is generated in the pressure chambers 11 and the droplets of ink are discharged from the nozzle 13. The resonance period of the meniscus of the ink in the nozzle 13 becomes the same as the Helmholtz's resonance period of ink in the pressure chambers 11.

When a gradation printing is to be performed by the number of discharging of droplets of ink, the volume of droplets of ink to be discharged by a single action should preferably be as small as possible in order to obtain printing of high quality.

Further, as the Helmholtz's resonance period of ink in the pressure chambers 11 becomes shorter, the droplets of ink can be discharged at a higher speed.

Since the Helmholtz's resonance period of ink in the pressure chambers 11 can be increased by decreasing the capacity of the pressure chambers 11, the capacity of pressure chambers 11 should preferably be made sufficiently small.

Figure 3:
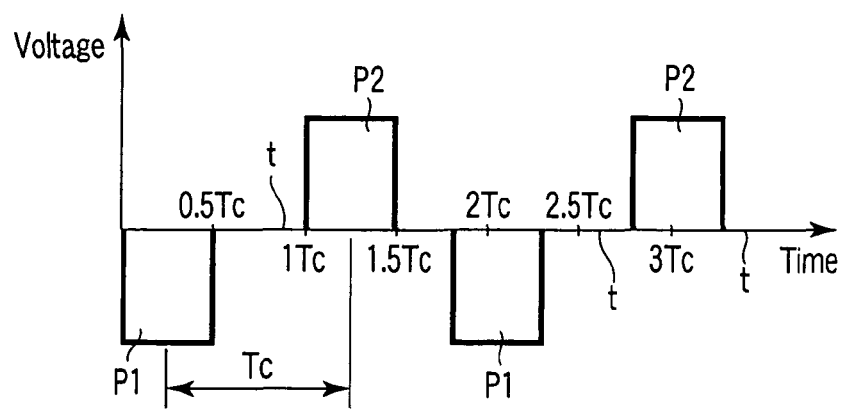
FIG. 3 is a diagram showing one example of driving signals to be generated from a driving signal-emitting means.

FIG. 3 illustrates a diagram of wave-shape showing one example of the driving signal to be emitted from the driving signal generating means 2. This driving signal is formulated such that a single driving pulse is constituted by an expansion pulse p1 for expanding the capacity of pressure chambers 11, a standby time t, and a contraction pulse p2 for contracting the capacity of pressure chambers 11. Through controlling of the number of this driving pulse, the number of droplets of ink to be discharged from the nozzle 13 is controlled, thereby making it possible to perform the gradation printing. A fixed delay time is set between the driving pulses.

When the printing is being performed at the aforementioned printing head, the ink-discharging portion of the head becomes equipotential with the ink. In the process of enabling ink to enter into the ink chamber, a region which is not equipotential with the ink exists and vibration is given to the ink by the electric field. Printing test was performed in order to investigate the ink discharging stability. In this test, a discharging head having about 300 nozzles each 40 μm in diameter was employed and printing was performed with $5.5 \times 10^9$ dots per hour. The printing was performed with the driving frequency of head being set to 4.8 kHz and the frequency of generating printing error was investigated.

As a result, the frequency of generating printing error was about twice per hour and hence the printing performance was recognized as being stable.

Next, the present invention will be further explained in detail with reference to specific examples.

Example 1

A black pigment dispersion was prepared according to the following formulation.

| | |
|---|---|
| Black pigment (PBK-7) | 10 wt % |
| 1st resin dispersing agent (Avecia.Solsperse 32000) | 3 wt % |
| Dispersant (Sakamoto Yakuhin: SR-NPG) | 87 wt % |

A recirculating type sand mill was filled with beads 0.3 mm in diameter and these starting materials were subjected to dispersion treatment for one hour to prepare a pigment dispersion. By using this pigment dispersion and according to the following formulation, an ink was prepared wherein the concentration of pigment was regulated to 4% by weight.

| | |
|---|---|
| Pigment dispersion | 35 wt % |
| Solvent (Sakamoto Yakuhin: SR-NPG) | 13 wt % |
| Solvent (Towa Gosei: OXT221) | 43 wt % |
| Sensitizer (Kawasaki Kasei: UVS1331) | 2 wt % |
| Polymerization initiator (DAICEL Kagaku: UVACURE1591) | 7 wt % |
| 2nd resin dispersing agent (Ajinomoto Finetechno: PB711) | 0-35 wt % based on pigment |

Before mixing these materials, the solvents and the sensitizer were added at first to the dispersion and then the resultant mixture was stirred for two hours in a mixer. After the sensitizer completely dissolved therein, the second resinous dispersing agent was added to the mixture, immediately after which the polymerization initiator was added to the resultant mixture and stirred. The resultant mixture was subjected to filtration by using a 1 μm membrane filter to manufacture an inkjet ink. By variously changing the mixing amount of the second resinous dispersing agent, a plurality of inkjet inks were prepared. The inks thus obtained were stored under a prescribed condition to measure the zeta potential, HPPS average particle diameter and viscosity of these inks, thus evaluating the storage stability thereof.

Figure 4:
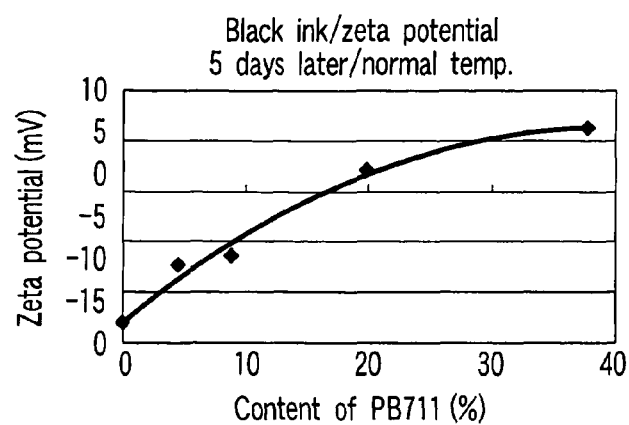
FIG. 4 is a graph representing the relationship between the quantity added of a second resinous dispersing agent and the zeta(ζ) potential in the inkjet ink of Example 1.

The zeta potential was determined according to the following procedure. First of all, after the ink was left to stand for five days at normal temperature, the electrophoretic mobility of ink was measured according to the electrophoresis laser Doppler method using a measuring cell for nonaquous solvent and ELS-8000 (Ohtsuka Denshi Co., Ltd.). Further, by using Huckel formula, the zeta potential of ink was determined from the electrophoretic mobility thus determined. The solvent employed in the measurement of the zeta potential was SR-NPG. The relationship between the mixing amount of the second resinous dispersing agent and the zeta potential is shown in the graph of FIG. 4. FIG. 4 shows that the zeta potential can be adjusted by the addition of the second resinous dispersing agent.

Figure 5:
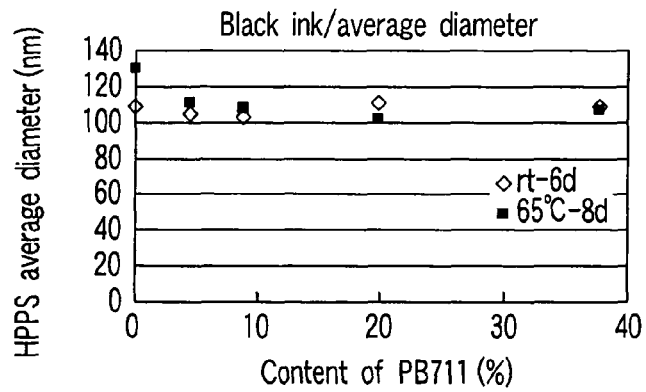
FIG. 5 is a graph representing the relationship between the quantity added of a second resinous dispersing agent and the average particle diameter in the inkjet ink of Example 1.
Figure 6:
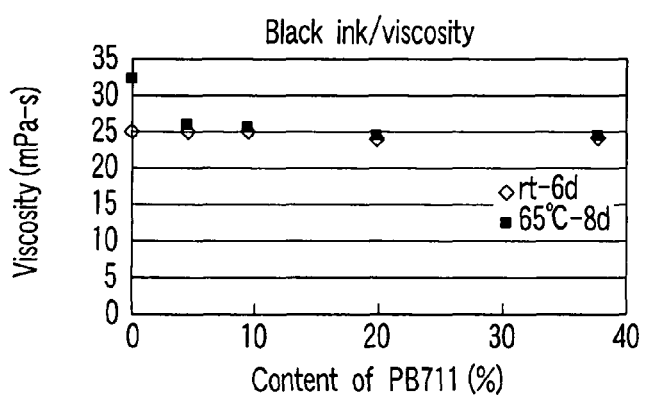
FIG. 6 is a graph representing the relationship between the quantity added of a second resinous dispersing agent and the viscosity in the inkjet ink of Example 1.

The relationship between the mixing amount of the second resinous dispersing agent and the HPPS average particle diameter is shown in the graph of FIG. 5. FIG. 6 shows the relationship between the mixing amount of the second resinous dispersing agent and the viscosity. When the second resinous dispersing agent was not incorporated at all, not only the average particle diameter but also the viscosity was sharply increased after the storage thereof at a temperature of 65° C., thus indicating poor storage stability. The zeta potential in this case was −13 mV as seen from the graph of FIG. 4. When the second resinous dispersing agent was incorporated at an amount of 5% by weight or more, it was possible to stabilize the average particle diameter and the viscosity. The zeta potential in this case was −10 mV or more.

Example 2

By using the same pigment dispersion as that of aforementioned Example 1, an inkjet ink 4 wt % in pigment concentration was prepared according to the following formulation.

| | |
|---|---|
| Pigment dispersion | 36 wt % |
| Solvent (Sakamoto Yakuhin: SR-NPG) | 14 wt % |
| Solvent (DAICEL Kagaku: Celloxide3000) | 44 wt % |
| Sensitizer (Kawasaki Kasei: UVS1331) | 1 wt % |
| Polymerization initiator (DAICEL Kagaku: UVACURE1591) | 5 wt % |
| 2nd resin dispersing agent (Ajinomoto Finetechno: PB711) | 0-35 wt % based on pigment |

Before mixing these materials, the solvents and the sensitizer were added at first to the dispersion and then the resultant mixture was stirred for two hours in a mixer. After the sensitizer completely dissolved therein, the second resinous dispersing agent was added to the mixture, immediately after which the polymerization initiator was added to the resultant mixture and stirred. The resultant mixture was subjected to filtration by using a 1 μm membrane filter to manufacture an inkjet ink. By variously changing the mixing amount of the second resinous dispersing agent, a plurality of inkjet inks were prepared. The inks thus obtained were stored under a prescribed condition to measure the zeta potential, HPPS average particle diameter and viscosity of these inks, thus evaluating the storage stability thereof.

Figure 7:
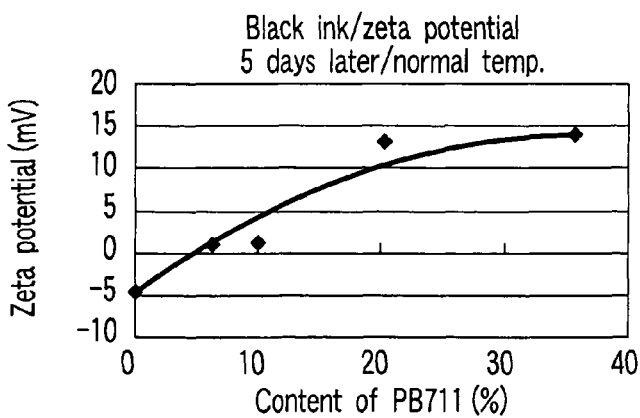
FIG. 7 is a graph representing the relationship between the quantity added of a second resinous dispersing agent and the zeta potential in the inkjet ink of Example 2.

The relationship between the mixing amount of the second resinous dispersing agent and the zeta potential is shown in the graph of FIG. 7. FIG. 7 shows that the zeta potential can be adjusted by the addition of the second resinous dispersing agent.

Figure 8:
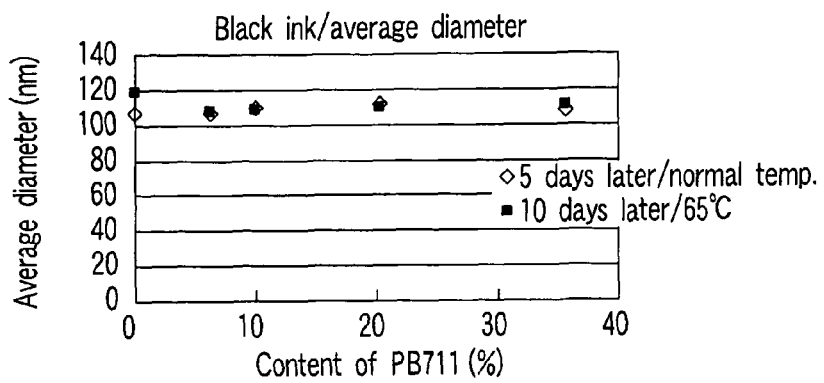
FIG. 8 is a graph representing the relationship between the quantity added of a second resinous dispersing agent and the average particle diameter in the inkjet ink of Example 2.
Figure 9:
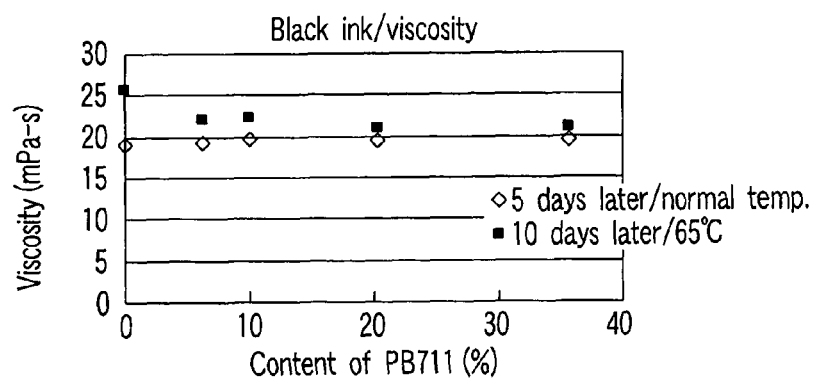
FIG. 9 is a graph representing the relationship between the quantity added of a second resinous dispersing agent and the viscosity in the inkjet ink of Example 2.

FIG. 8 shows the relationship between the mixing amount of the second resinous dispersing agent and the HPPS average particle diameter. FIG. 9 shows the relationship between the mixing amount of the second resinous dispersing agent and the viscosity. When the second resinous dispersing agent was not incorporated at all, not only the average particle diameter but also the viscosity was slightly increased after the storage thereof at a temperature of 65° C. However, an increment of not more than 20% is considered acceptable. When the second resinous dispersing agent was incorporated at an amount of 5% by weight or more, it was possible to further stabilize the average particle diameter and the viscosity. The zeta potential in this case was −10 mV or more.

Example 3

A cyan pigment dispersion was prepared according to the following formulation.

| | |
|---|---|
| Cyan pigment (PB15: 3) | 10 wt % |
| 1st resin dispersing agent (Avecia.Solsperse 32000) | 3 wt % |
| Dispersant (Sakamoto Yakuhin: SR-NPG) | 87 wt % |

A recirculating type sand mill was filled with beads 0.3 mm in diameter and these starting materials were subjected to dispersion treatment for one hour to prepare a pigment dispersion. By using this pigment dispersion and according to the following formulation, an ink was prepared wherein the concentration of pigment was regulated to 5% by weight.

| | |
|---|---|
| Pigment dispersion | 44 wt % |
| Solvent (Sakamoto Yakuhin: SR-NPG) | 6 wt % |
| Solvent (Daicel Kagaku: Celloxide3000) | 44 wt % |
| Sensitizer (Kawasaki Kasei: UVS1331) | 1 wt % |
| Polymerization initiator (Daicel Kagaku: UVACURE1591) | 5 wt % |
| 2nd resin dispersing agent (Ajinomoto Finetechno: PB711) | 0-35 wt % based on pigment |

Before mixing these materials, the solvents and the sensitizer were added at first to the dispersion and then the resultant mixture was stirred for two hours in a mixer. After the sensitizer completely dissolved therein, the second resinous dispersing agent was added to the mixture, immediately after which the polymerization initiator was added to the resultant mixture and stirred. The resultant mixture was subjected to filtration by using a 1 μm membrane filter to manufacture an inkjet ink. By variously changing the mixing amount of the second resinous dispersing agent, a plurality of inkjet inks were prepared. The inks thus obtained were stored under a prescribed condition to measure the zeta potential, HPPS average particle diameter and viscosity of these inks, thus evaluating the storage stability thereof.

Figure 10:
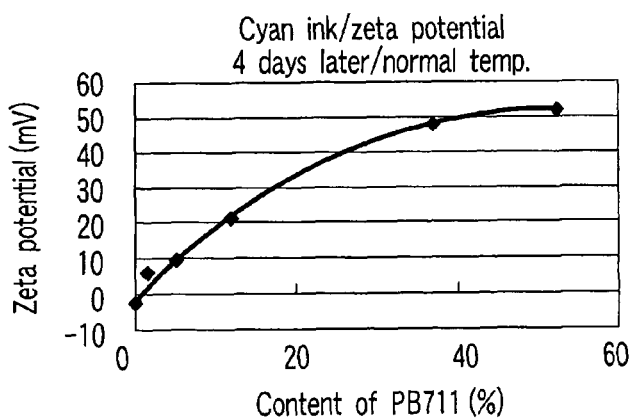
FIG. 10 is a graph representing the relationship between the quantity added of a second resinous dispersing agent and the zeta potential in the inkjet ink of Example 3.

The relationship between the mixing amount of the second resinous dispersing agent and the zeta potential is shown in the graph of FIG. 10. FIG. 10 shows that the zeta potential can be adjusted by the addition of the second resinous dispersing agent.

Figure 11:
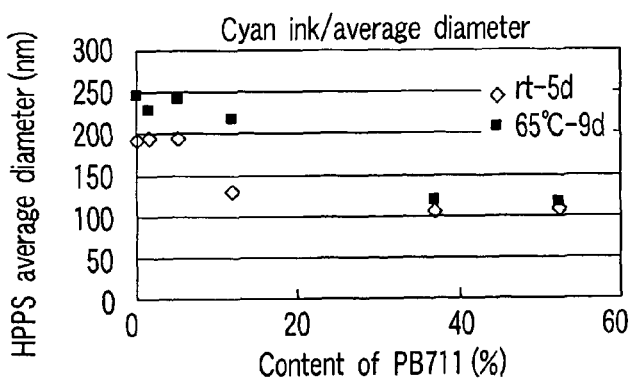
FIG. 11 is a graph representing the relationship between the quantity added of a second resinous dispersing agent and the average particle diameter in the inkjet ink of Example 3.
Figure 12:
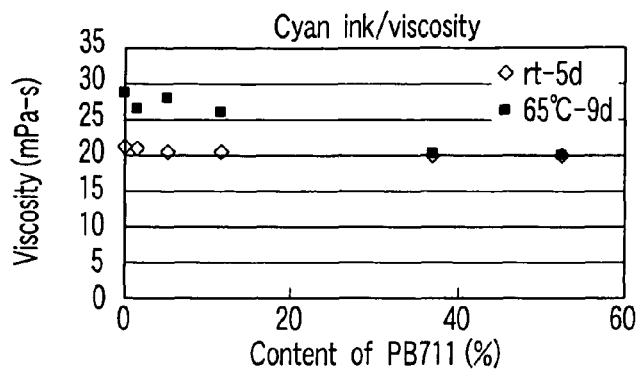
FIG. 12 is a graph representing the relationship between the quantity added of a second resinous dispersing agent and the viscosity in the inkjet ink of Example 3.

The relationship between the mixing amount of the second resinous dispersing agent and the HPPS average particle diameter is shown in the graph of FIG. 11. FIG. 12 shows the relationship between the mixing amount of the second resinous dispersing agent and the viscosity. When the mixing amount of the second resinous dispersing agent was confined to 0 to 10% by weight, not only the average particle diameter but also the viscosity was sharply increased after the storage thereof at a temperature of 65° C., thus indicating poor storage stability. The zeta potential in this case was −3 mV to 21 mV as seen from the graph of FIG. 10. When the second resinous dispersing agent was incorporated at an amount of 35% by weight or more, it was possible to stabilize the average particle diameter and the viscosity. The zeta potential in this case was 45 mV or more.

Example 4

A yellow pigment dispersion was prepared according to the following formulation.

| | |
|---|---|
| Yellow pigment (PY-150) | 10 wt % |
| 1st resin dispersing agent (Avecia.Solsperse 32000) | 3 wt % |
| 1st resin dispersing agent (Avecia.Solsperse 22000) | 0.3 wt % |
| Dispersant (Sakamoto Yakuhin: SR-NPG) | 86.7 wt % |

A recirculating type sand mill was filled with beads 0.3 mm in diameter and these starting materials were subjected to dispersion treatment for one hour to prepare a pigment dispersion. By using this pigment dispersion and according to the following formulation, an ink was prepared wherein the concentration of pigment was regulated to 5% by weight.

| | |
|---|---|
| Pigment dispersion | 43 wt % |
| Solvent (Sakamoto Yakuhin: SR-NPG) | 6 wt % |
| Solvent (Towa Gosei: OXT221) | 43 wt % |
| Sensitizer (Kawasaki Kasei: UVS1331) | 2 wt % |
| Polymerization initiator (Daicel Kagaku: Uvacure1591) | 6 wt % |
| 2nd resin dispersing agent (Ajinomoto Finetechno: PB711) | 0-55 wt % based on pigment |

Before mixing these materials, the solvents and the sensitizer were added at first to the dispersion and then the resultant mixture was stirred for two hours in a mixer. After the sensitizer completely dissolved therein, the second resinous dispersing agent was added to the mixture, immediately after which the polymerization initiator was added to the resultant mixture and stirred. The resultant mixture was subjected to filtration by using a 1 μm membrane filter to manufacture an inkjet ink. By variously changing the mixing ratio of the second resinous dispersing agent, a plurality of inkjet inks were prepared. The inks thus obtained were stored under a prescribed condition to measure the zeta potential, HPPS average particle diameter and viscosity of these inks, thus evaluating the storage stability thereof.

Figure 13:
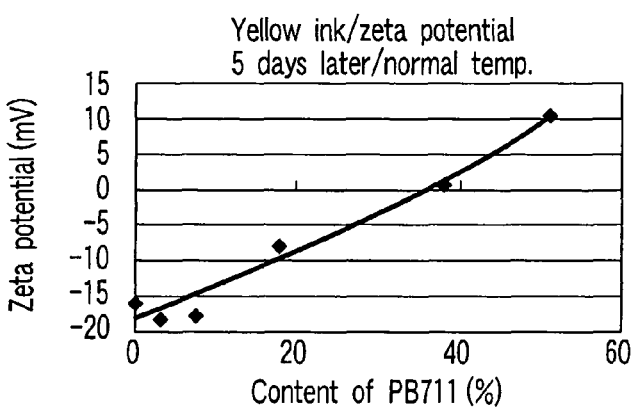
FIG. 13 is a graph representing the relationship between the quantity added of a second resinous dispersing agent and the zeta potential in the inkjet ink of Example 4.

The relationship between the mixing amount of the second resinous dispersing agent and the zeta potential is shown in the graph of FIG. 13. FIG. 13 shows that the zeta potential can be adjusted by the addition of the second resinous dispersing agent.

Figure 14:
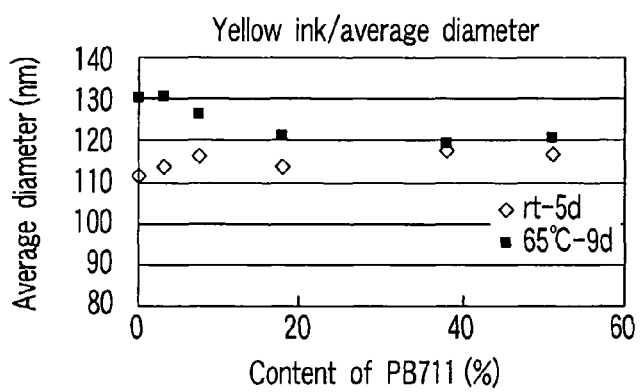
FIG. 14 is a graph representing the relationship between the quantity added of a second resinous dispersing agent and the average particle diameter in the inkjet ink of Example 4.
Figure 15:
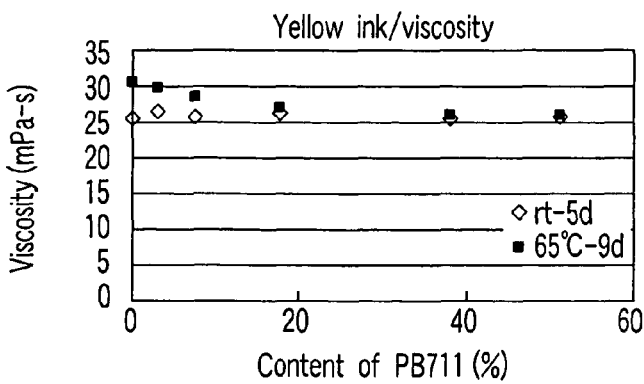
FIG. 15 is a graph representing the relationship between the quantity added of a second resinous dispersing agent and the viscosity in the inkjet ink of Example 4.

The relationship between the mixing amount of the second resinous dispersing agent and the HPPS average particle diameter is shown in the graph of FIG. 14. FIG. 15 shows the relationship between the mixing amount of the second resinous dispersing agent and the viscosity. When the mixing amount of the second resinous dispersing agent was confined to 0 to 7% by weight, not only the average particle diameter but also the viscosity was sharply increased after the storage thereof at a temperature of 65° C., thus indicating poor storage stability. The zeta potential in this case was −18 to −15 mV as seen from the graph of FIG. 13. When the mixing amount of the second resinous dispersing agent was set to 15% by weight and the zeta potential was controlled to −8 mV, the average particle diameter and the viscosity were both increased more or less but these increments were considered acceptable. When the second resinous dispersing agent was incorporated at an amount of 35% by weight or more, it was possible to stabilize the average particle diameter and the viscosity. The zeta potential in this case was 0 mV or more. Further, the zeta potential after the storage thereof at a temperature of 65° C. was also 0 mV or more.

Example 5

Four kinds of cyan ink were prepared by following the same procedure as described in Example 3 except that the kind of the second resinous dispersing agent was changed. Incidentally, the mixing amount of the second resinous dispersing agent was set to 35% by weight. The inks thus obtained were stored for 10 days at a temperature of 65° C. to determine the zeta potential and the rate of increase in particle diameter. The results are summarized in the following Table 1.

TABLE 1

|  | Zeta potential (normal temp.) | Ratio of increase in diameter (65° C. 10 days) |
|---|---|---|
| PB711 | 48 mV | 1.11 |
| PLAAD-ED221 | 32 mV | 1.21 |
| PB821 | 38 mV | 1.19 |
| PB822 | 40 mV | 1.15 |

Incidentally, among the second resinous dispersing agents employed herein, PLAAD-ED221 was a polymer dispersing agent (Kusumoto Kasei Co., Ltd.). PB821 and PB822 were respectively a polymer dispersing agent (Ajinomoto Finetechno Co., Ltd.).

It will be recognized from the results of Table 1 that every dispersing agents were more or less effective, PB711 (Ajinomoto Finetechno Co., Ltd.) was found most effective.

Example 6

A cyan ink was prepared by following the same procedure as described in Example 3 except that the polymerization initiator was not incorporated therein. The mixing amount of the second resinous dispersing agent was set to 35% by weight. When the ink thus obtained was stored for 24 hours at a temperature of 65° C., the dispersion was hardened as a gel like. When the polymerization initiator was incorporated in the ink at an amount of 5% by weight after the ink was stored for one week at normal temperature, the ratio of increase in particle diameter was 1.6 times or more.

Example 7

A white pigment dispersion was prepared according to the following formulation.

| White pigment (Ishihara Sangyo Co., Ltd.: titanium oxide) | 40 wt % |
|---|---|
| 1st resin dispersing agent (Avecia.Solsperse 21000) | 4 wt % |
| Dispersant (Sakamoto Yakuhin: SR-NPG) | 56 wt % |

By using an ultrasonic homogenizer (Nippon Seiki Co., Ltd.: US-300T, 20 kHz, 300W), these starting materials were subjected to dispersion treatment for 20 minutes to prepare a pigment dispersion. By using this pigment dispersion and according to the following formulation, an ink was prepared wherein the concentration of pigment was regulated to 28% by weight.

| Pigment dispersion | 46 wt % |
|---|---|
| Solvent (Sakamoto Yakuhin: SR-NPG) | 8 wt % |
| Solvent (Toa Gosei: OXT221) | 34 wt % |
| Sensitizer (Kawasaki Kasei: UVS1331) | 2 wt % |
| Polymerization initiator (Daicel Kagaku: Uvacure1591) | 5 wt % |
| 2nd resin dispersing agent (Ajinomoto Finetechno: PB711) | 0-40 wt % based on pigment |

Before mixing these materials, the solvents and the sensitizer were added at first to the dispersion and then the resultant mixture was stirred for two hours in a mixer. After the sensitizer completely dissolved therein, the second resinous dispersing agent was added to the mixture, immediately after which the polymerization initiator was added to the resultant mixture and stirred. The resultant mixture was subjected to filtration by using a 1 μm membrane filter to manufacture an inkjet ink. By variously changing the mixing amount of the second resinous dispersing agent, a plurality of inkjet inks were prepared. The inks thus obtained were stored under a prescribed condition to measure the zeta potential, HPPS average particle diameter and viscosity of these inks, thus evaluating the storage stability thereof.

Figure 16:
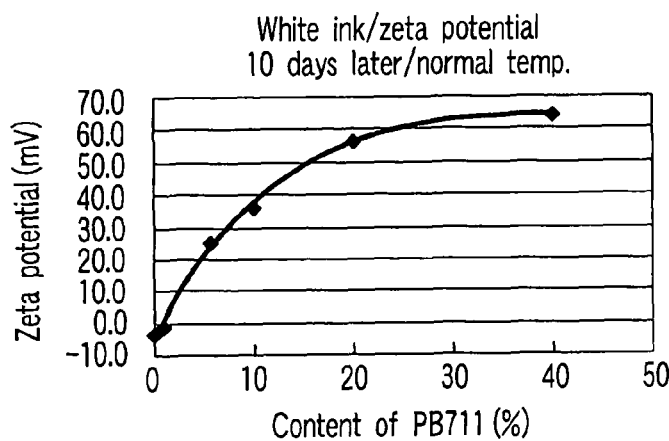
FIG. 16 is a graph representing the relationship between the quantity added of a second resinous dispersing agent and the zeta potential in the inkjet ink of Example 7.

The relationship between the mixing amount of the second resinous dispersing agent and the zeta potential is shown in the graph of FIG. 16. FIG. 16 shows that the zeta potential can be adjusted by the addition of the second resinous dispersing agent.

Figure 17:
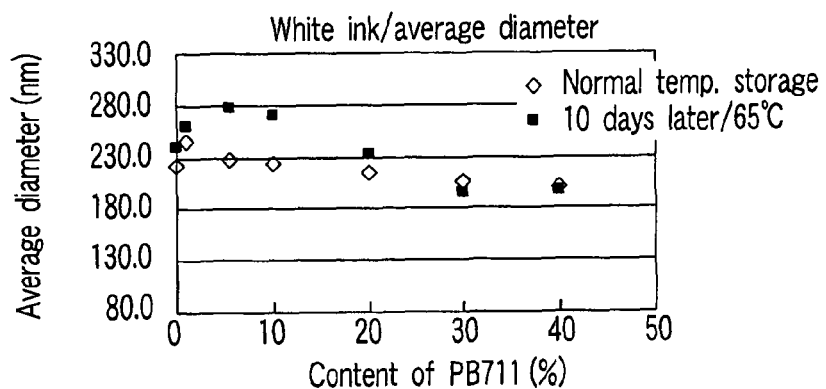
FIG. 17 is a graph representing the relationship between the quantity added of a second resinous dispersing agent and the average particle diameter in the inkjet ink of Example 7.
Figure 18:
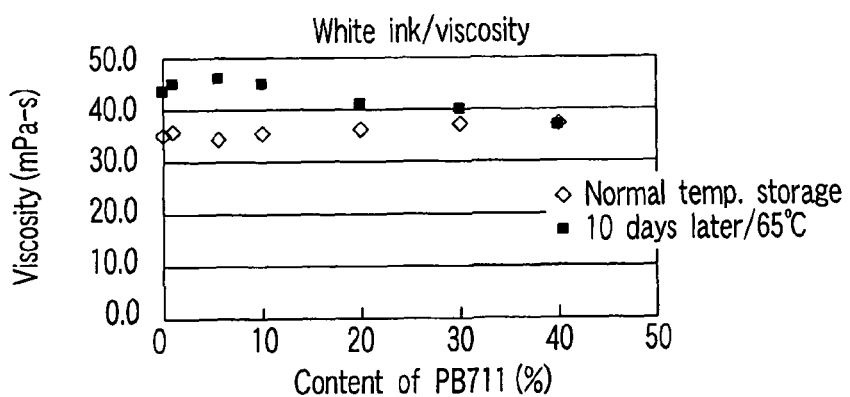
FIG. 18 is a graph representing the relationship between the quantity added of a second resinous dispersing agent and the viscosity in the inkjet ink of Example 7.

The relationship between the mixing amount of the second resinous dispersing agent and the HPPS average particle diameter is shown in the graph of FIG. 17. FIG. 18 shows the relationship between the mixing amount of the second resinous dispersing agent and the viscosity. When the mixing amount of the second resinous dispersing agent was confined to 0 to 10% by weight, not only the average particle diameter but also the viscosity was sharply increased after the storage thereof at a temperature of 65° C., thus indicating poor storage stability. The zeta potential in this case was −4 to 36 mV as seen from the graph of FIG. 16. When the second resinous dispersing agent was incorporated at an amount of 20% by weight or more, it was possible to stabilize both of the average particle diameter and the viscosity. The zeta potential in this case was +50 mV or more.

According to one aspect of the present invention, it is possible to provide an inkjet ink wherein the pigment particles are enabled to disperse excellently and which is suitable for use as a UV-curing type inkjet ink for on-demand printing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inkjet ink comprising:
    a pigment dispersion containing an organic dispersion medium, a black pigment having a z-average particle diameter of not more than 200 nm, first resinous dispersing agent and second resinous dispersing agent different from the first resinous dispersing agent, the organic dispersion medium being at least one polymerizable compound, the black pigment being at an amount ranging from 2 to 30% by weight based on the organic dispersion medium, and an ionic compound;
    wherein a $\zeta$-potential of the black pigment to the at least one polymerizable compound of the organic dispersion medium is confined within the range of −10 mV to +100 mV, the first and second resinous dispersing agents being adsorbed to the black pigment, the $\zeta$-potential being determined by subjecting the inkjet ink to electrophoresis; and
    wherein the second resinous dispersing agent is a resinous polymer dispersing agent having a basic terminal, and amine value ranging from 5 to 200 mgKOH/g and a number average molecular weight ranging from 1,000 to 100,000 and is incorporated at an amount ranging from 2 to 60% by weight based on the pigment.

2. The inkjet ink according to claim 1, wherein the $\zeta$-potential of the black pigment is more than 0 mV and not more than +100 mV.

3. The inkjet ink according to claim 1, wherein the organic dispersion medium includes at least one kind of photo-cation polymerizable compound and has a viscosity of not more than 30 mPa·s at 25° C., and the ionic compound is a photo-cation polymerization initiator.

4. The inkjet ink according to claim 3, wherein the photo-cation polymerizable compound is at least one selected from the group consisting of limonene dioxide, neopentylglycol diglycidyl ether, [1-ethyl(3-oxetanyl)]methyl ether, and a cyclic ether compound having a vinyl ether structure.

5. An inkjet ink comprising:
    a pigment dispersion containing an organic dispersion medium, a cyan pigment having a z-average particle diameter of not more than 200 nm, first resinous dispersing agent and second resinous dispersing agent different from the first resinous dispersing agent, the organic dispersion medium being at least one polymerizable compound, the cyan pigment being at an amount ranging from 2 to 30% by weight based on the organic dispersion medium, and an ionic compound;
    wherein a $\zeta$-potential of the cyan pigment to the at least one polymerizable compound of the organic dispersion medium is confined within the range of +30 mV to +100 mV, the first and second resinous dispersing agents being adsorbed to the cyan pigment, the $\zeta$-potential being determined by subjecting the inkjet ink to electrophoresis; and
    wherein the second resinous dispersing agent is a resinous polymer dispersing agent having a basic terminal, an amine value ranging from 5 to 200 mgKOH/g and a number average molecular weight ranging from 1,000 to 100,000 and is incorporated at an amount ranging from 2 to 60% by weight based on the pigment.

6. The inkjet ink according to claim 5, wherein the organic dispersion medium includes at least one kind of photo-cation polymerizable compound and has a viscosity of not more than 30 mPa·s at 25° C., and the ionic compound is a photo-cation polymerization initiator.

7. The inkjet ink according to claim 6, wherein the photo-cation polymerizable compound is at least one selected from the group consisting of limonene dioxide, neopentylglycol diglycidyl ether, [1-ethyl(3-oxetanyl)]methyl ether, and a cyclic ether compound having a vinyl ether structure.

8. An inkjet ink comprising:
    a pigment dispersion containing an organic dispersion medium, a yellow pigment having a z-average particle diameter of not more than 200 nm, first resinous dispersing agent and second resinous dispersing agent different from the first resinous dispersing agent, the organic dispersion medium being at least one polymerizable compound, the yellow pigment being at an amount ranging from 2 to 30% by weight based on the organic dispersion medium, and an ionic compound;
    wherein a $\zeta$-potential of the yellow pigment to the at least one polymerizable compound of the organic dispersion medium is confined within the range of −15 mV to +100 mV, the first and second resinous dispersing agents being adsorbed to the yellow pigment, the $\zeta$-potential being determined by subjecting the inkjet ink to electrophoresis; and
    wherein the second resinous dispersing agent is a resinous polymer dispersing agent having a basic terminal, an amine value ranging from 5 to 200 mgKOH/g and a number average molecular weight ranging from 1,000 to 100,000 and is incorporated at an amount ranging from 2 to 60% by weight based on the pigment.

9. The inkjet ink according to claim 8, wherein the $\zeta$-potential of the yellow pigment is more than 0 mV and not more than +100 mV.

10. The inkjet ink according to claim 8, wherein the organic dispersion medium includes at least one kind of photo-cation polymerizable compound and has a viscosity of not more than 30 mPa·s at 25° C., and the ionic compound is a photo-cation polymerization initiator.

11. The inkjet ink according to claim 10, wherein the photo-cation polymerizable compound is at least one selected from the group consisting of limonene dioxide, neopentylglycol diglycidyl ether, [1-ethyl(3-oxetanyl)]methyl ether, and a cyclic ether compound having a vinyl ether structure.

12. An inkjet ink comprising:
    a pigment dispersion containing an organic dispersion medium, a white pigment having a z-average particle diameter of not more than 300 nm, first resinous dispersing agent and second resinous dispersing agent different from the first resinous dispersing agent, the organic dispersion medium being at least one polymerizable compound, the white pigment being at an amount ranging from 2 to 50% by weight based on the organic dispersion medium, and an ionic compound;
    wherein a $\zeta$-potential of the white pigment to the at least one polymerizable compound of the organic dispersion medium is confined within the range of +40 mV to +100 mV, the first and second resinous dispersing agents being adsorbed to the white pigment, the ζ-potential being determined by subjecting the inkjet ink to electrophoresis; and wherein the second resinous dispersing agent is a resinous polymer dispersing agent having a basic terminal, an amine value ranging from 5 to 200 mgKOH/g and a number average molecular weight ranging from 1,000 to 100,000 and is incorporated at an amount ranging from 2 to 60% by weight based on the pigment.

13. The inkjet ink according to claim 12, wherein the organic dispersion medium includes at least one kind of photo-cation polymerizable compound and has a viscosity of not more than 30 mPa·s at 25° C., and the ionic compound is a photo-cation polymerization initiator.

14. The inkjet ink according to claim 13, wherein the photo-cation polymerizable compound is at least one selected from the group consisting of limonene dioxide, neopentylglycol diglycidyl ether, [1-ethyl(3-oxetanyl)]methyl ether, and a cyclic ether compound having a vinyl ether structure.

15. The inkjet ink according to claim 1, wherein when the inkjet ink is subjected to the electrophoresis, a nonaqueous solvent selected from the organic dispersion medium and a major component of the organic dispersion medium is used as a solvent.

16. The inkjet ink according to claim 5, wherein when the inkjet ink is subjected to the electrophoresis, a nonaqueous solvent selected from the organic dispersion medium and a major component of the organic dispersion medium is used as a solvent.

17. The inkjet ink according to claim 8, wherein when the inkjet ink is subjected to the electrophoresis, a nonaqueous solvent selected from the organic dispersion medium and a major component of the organic dispersion medium is used as a solvent.

18. The inkjet ink according to claim 12, wherein when the inkjet ink is subjected to the electrophoresis, a nonaqueous solvent selected from the organic dispersion medium and a major component of the organic dispersion medium are used as a solvent.

* * * * *